July 23, 1946.  D. H. SLOAN  2,404,542
RESONATOR FOR OSCILLATORS
Original Filed Nov. 4, 1940   10 Sheets-Sheet 2
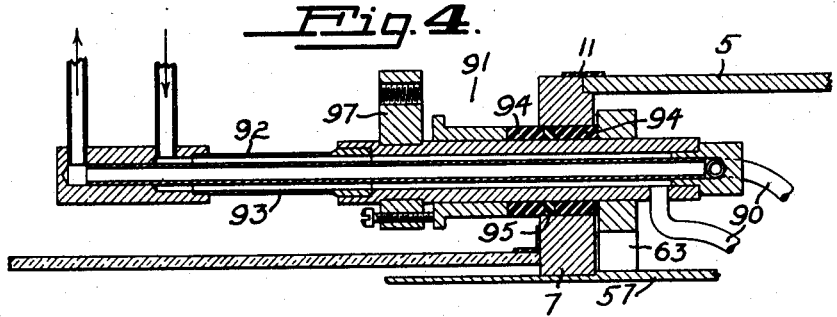
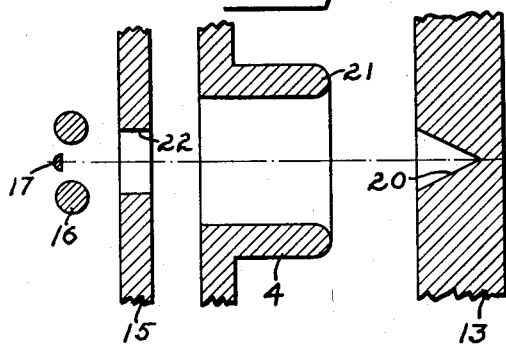
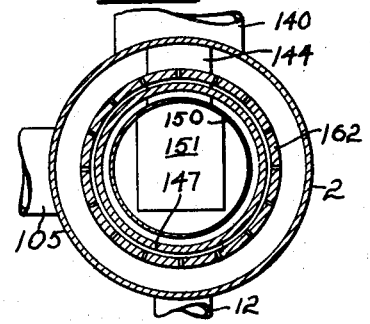
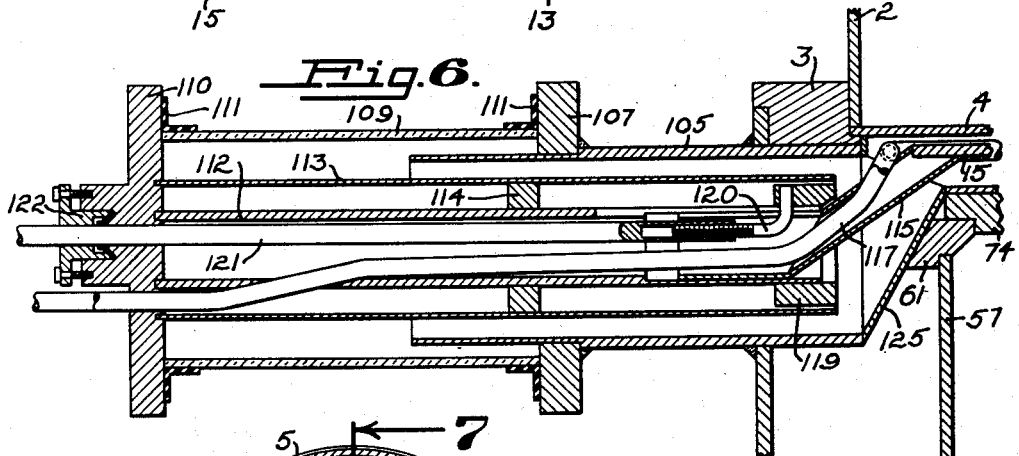
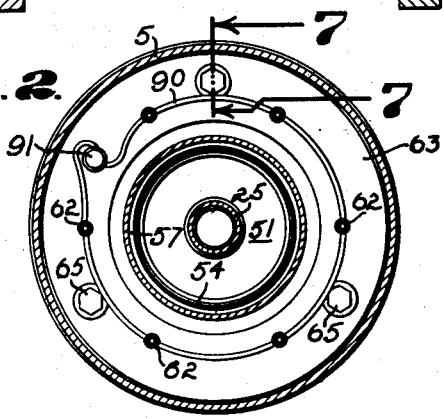
INVENTOR.
DAVID H. SLOAN.
BY
ATTORNEYS.

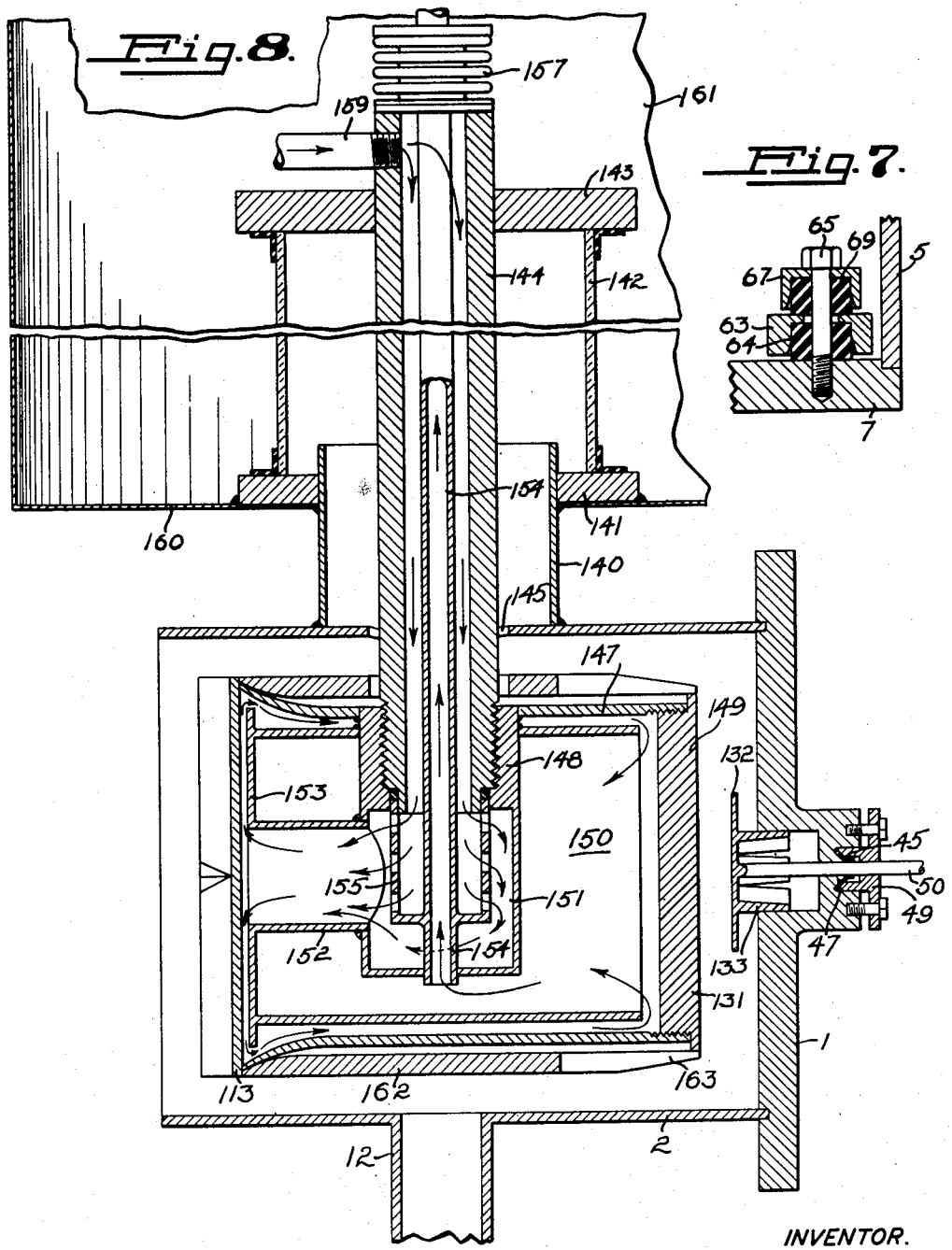

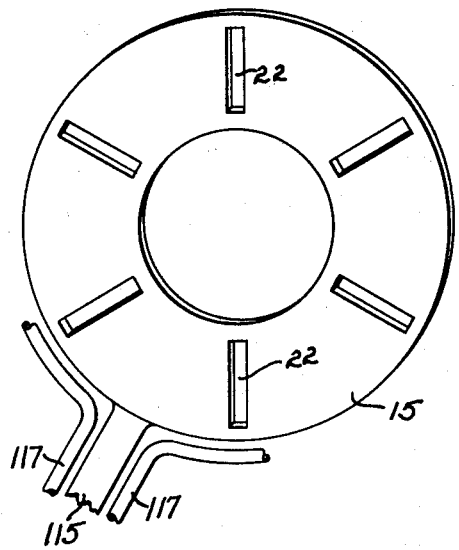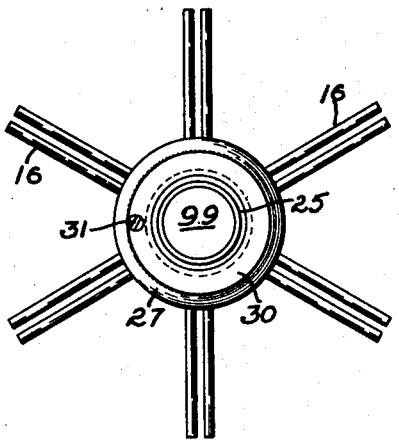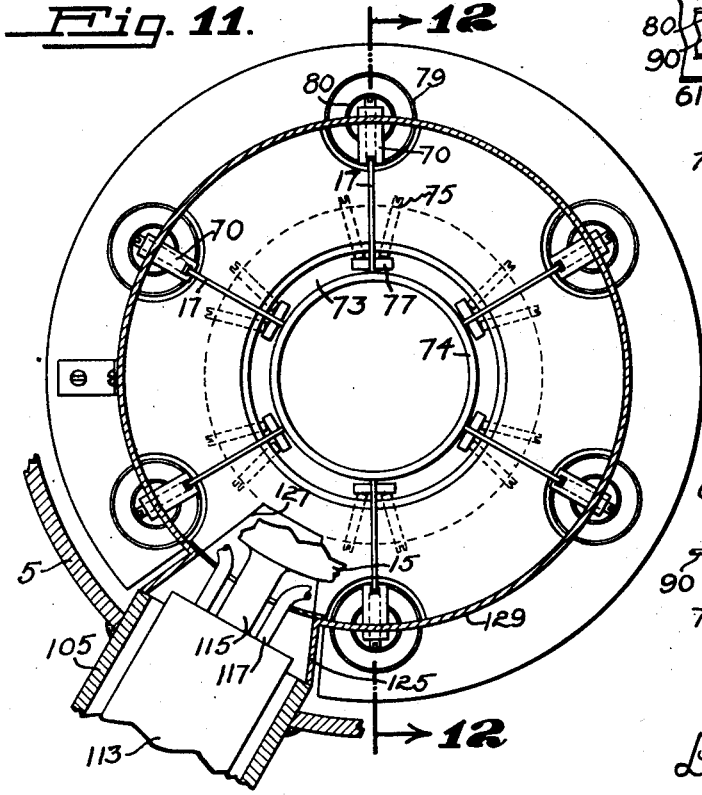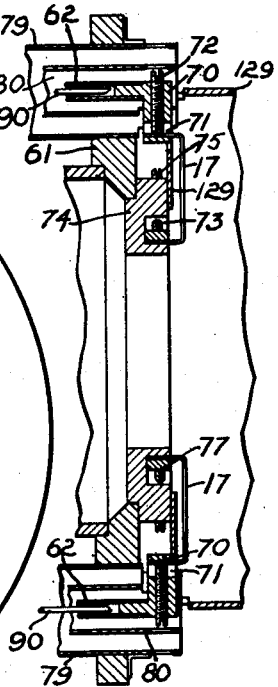

July 23, 1946. D. H. SLOAN 2,404,542
RESONATOR FOR OSCILLATORS
Original Filed Nov. 4, 1940 10 Sheets-Sheet 5
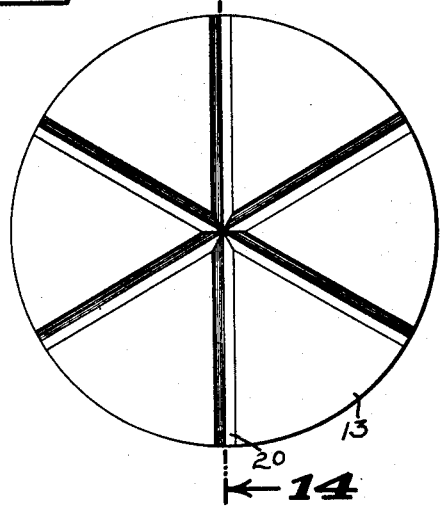
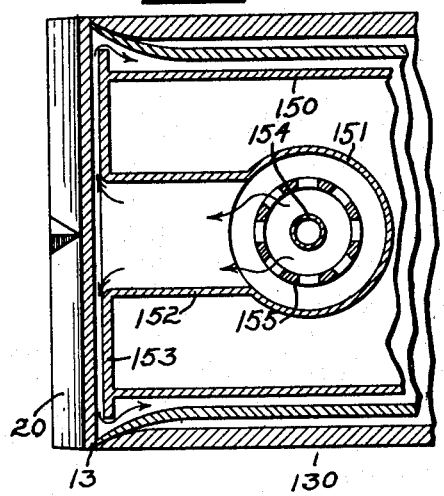
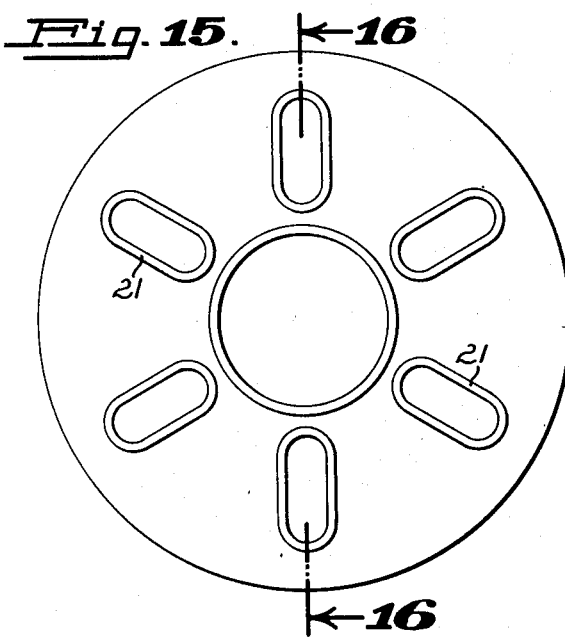
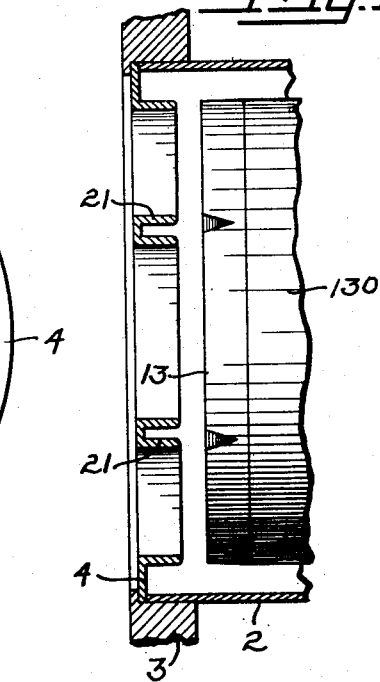
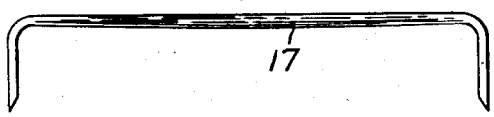
INVENTOR.
DAVID H. SLOAN.
ATTORNEYS.

July 23, 1946.  D. H. SLOAN  2,404,542
RESONATOR FOR OSCILLATORS
Original Filed Nov. 4, 1940   10 Sheets-Sheet 6
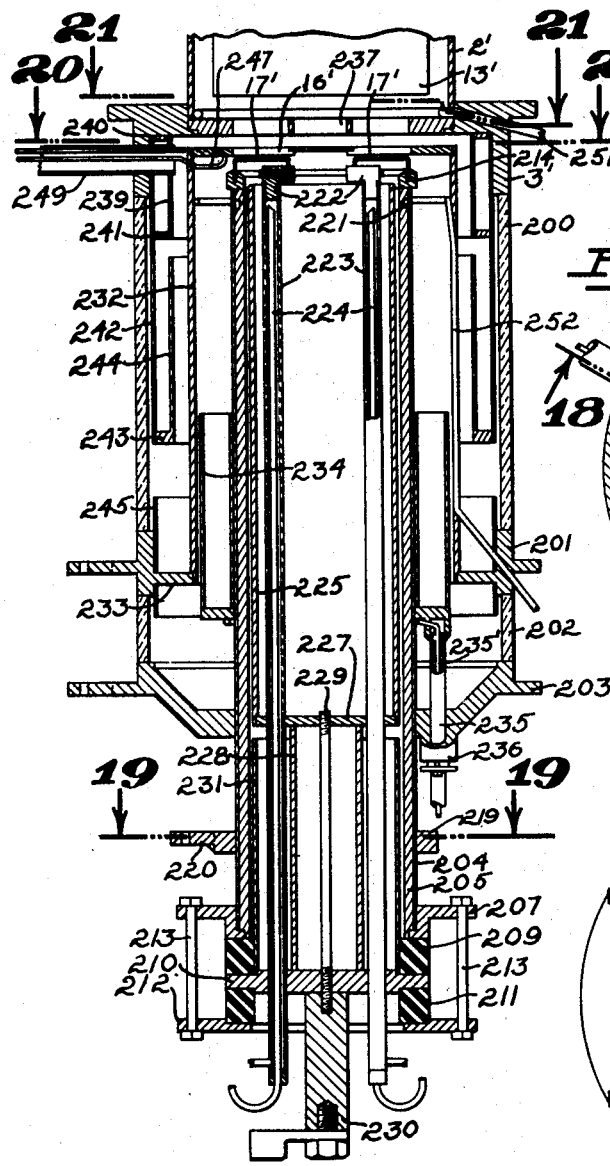
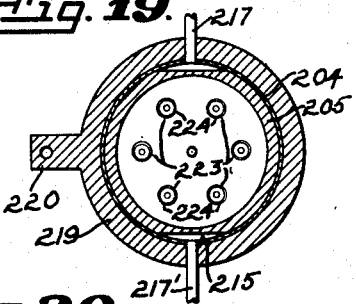
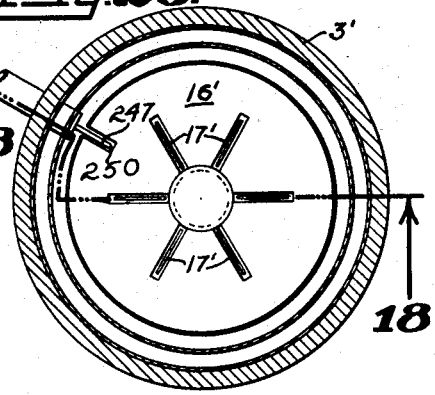
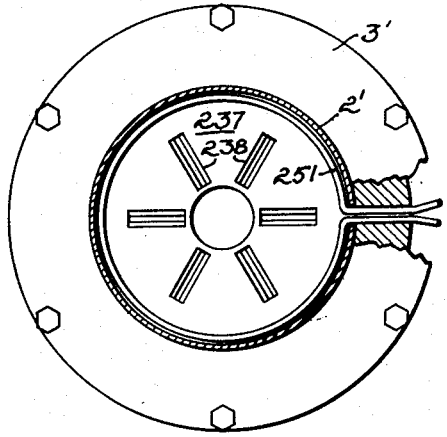
INVENTOR.
DAVID H. SLOAN.
BY
Lippincott & Metcalf
ATTORNEYS.

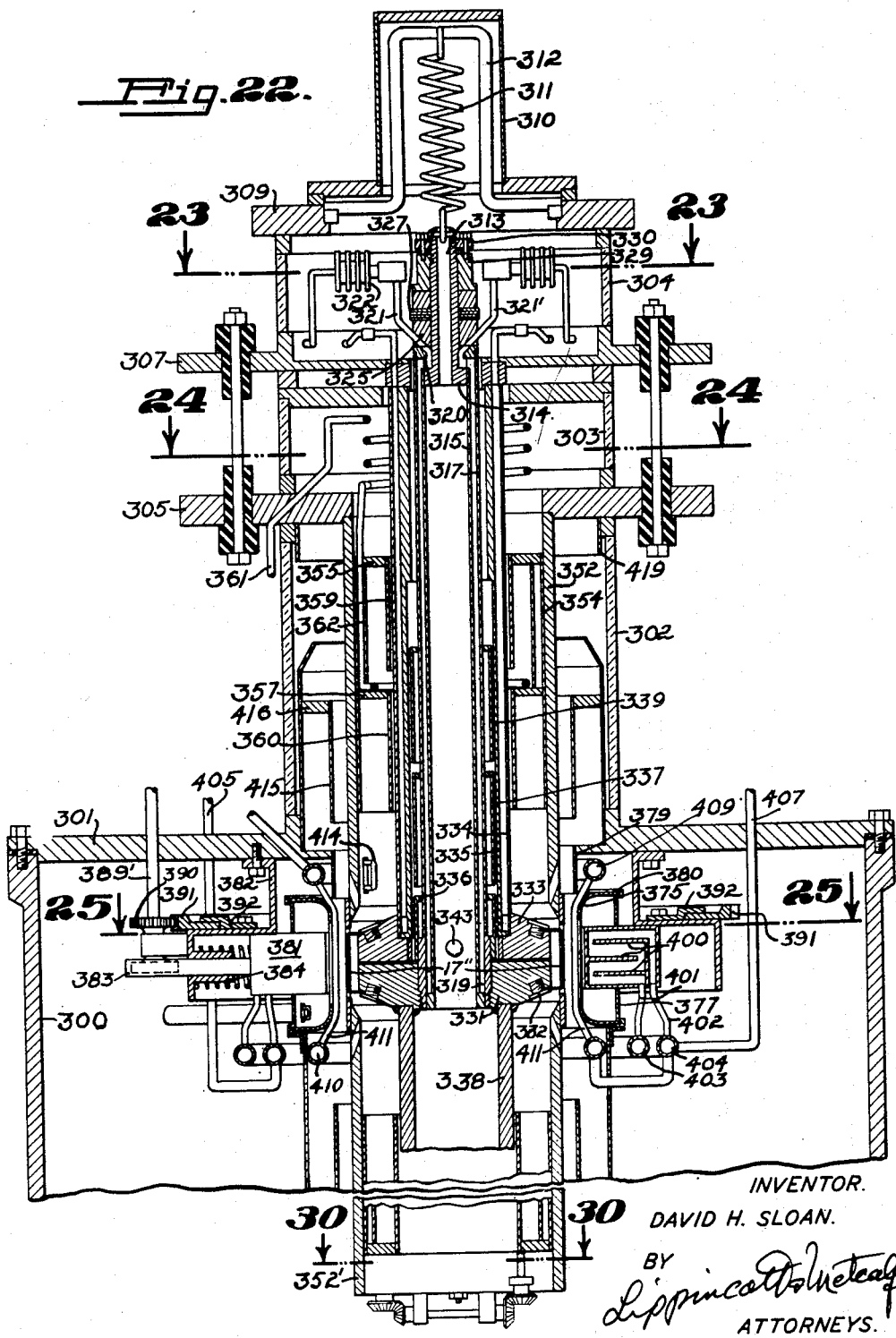

July 23, 1946.  D. H. SLOAN  2,404,542
RESONATOR FOR OSCILLATORS
Original Filed Nov. 4, 1940  10 Sheets-Sheet 8

INVENTOR.
DAVID H. SLOAN.
BY
*Lippincott & Metcalf*
ATTORNEYS.

July 23, 1946.  D. H. SLOAN  2,404,542
RESONATOR FOR OSCILLATORS
Original Filed Nov. 4, 1940   10 Sheets-Sheet 9
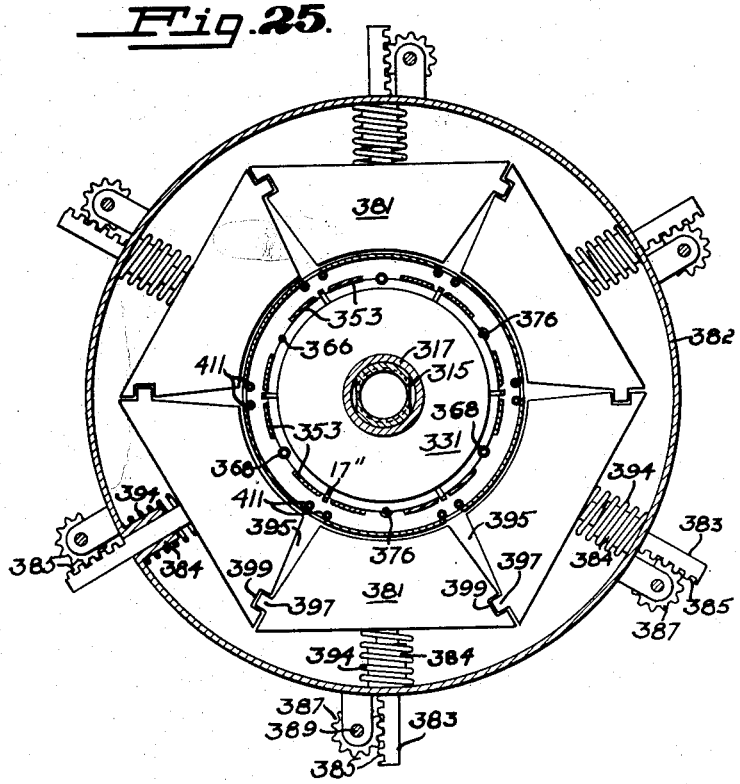
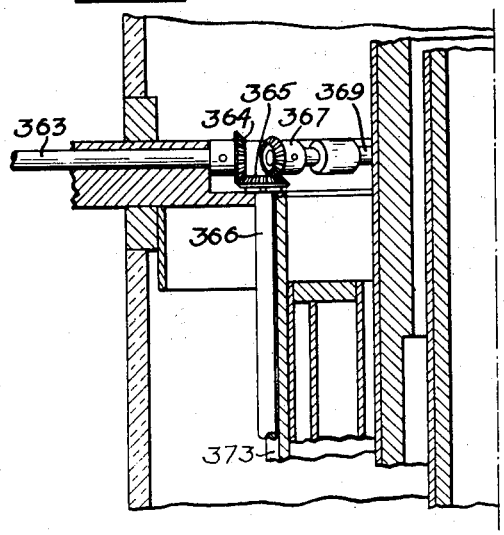
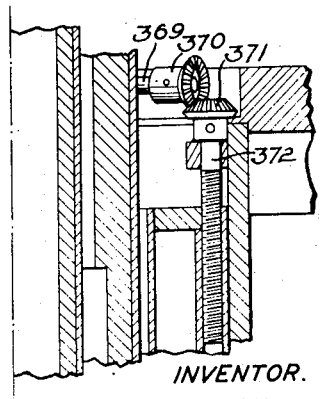
INVENTOR.
DAVID H. SLOAN.
BY
ATTORNEYS.

July 23, 1946. D. H. SLOAN 2,404,542
RESONATOR FOR OSCILLATORS
Original Filed Nov. 4, 1940 10 Sheets—Sheet 10

INVENTOR.
DAVID H. SLOAN.
BY
Lippincott & Metcalf
ATTORNEYS.

Patented July 23, 1946

2,404,542

UNITED STATES PATENT OFFICE 2,404,542

RESONATOR FOR OSCILLATORS

David H. Sloan, Berkeley, Calif., assignor to Research Corporation, New York, N. Y., a corporation of New York Original application November 4, 1940, Serial No. 364,284. Divided and this application June 9, 1941, Serial No. 397,235

21 Claims. (Cl. 178—44)

This invention relates to electronic tubes, and particularly to tubes adapted for the production and modulation of ultra-high frequency oscillations, i. e., oscillations of frequencies of the order of 1,000 megacycles. This application is a division of my prior application Serial No. 364,284, filed November 4, 1940.

The progress of electronic and radio development since the inception of the art has been marked by two steady advances. One of these advances has been toward higher power, the other toward higher frequencies. The latter line of advancement has been, to a certain extent at least, incompatible with the first, since with increasing frequency the effect of interelectrode capacity has become greater and more troublesome. Nevertheless, up to the last few years, the difficulties have been met by a steady evolutionary process consisting in large degree of refinement in detail, which has enabled the vacuum tube art to keep pace with the increasingly rigid demands of the manufacturers and operators of transmitting and receiving apparatus.

The attempt within recent years to carry the useful spectrum into the range of wavelengths in the range of a meter and less has involved difficulties of a new order of magnitude. For one thing, the frequencies involved are so high that the transit time of an electron stream across the interelectrode spaces of the tubes becomes an appreciable fraction of a cycle. For another, even with connecting leads reduced to minimum lengths, their inductance has been sufficient so that the capacities required in tuning them to the desired frequencies are small in comparison with the interelectrode capacities in conventional tube structures and these capacities have therefore become not merely a nuisance, limiting the efficiency of operation, but frequently an absolute bar to such operation; so much so, in fact, that it has been only with tubes of very small size and consequent small power output that operation has been obtainable at all.

There therefore exists at the present time a need for a tube which will meet the severe requirements of producing large power outputs by generation or amplification at extremely high frequencies. These requirements are first, a cathode-grid structure which will effectively modulate an electron stream without the application of excessive control voltages; second, a cathode-grid structure whose capacity and inductance relationships are so proportioned that they may be tuned to the high operating frequencies desired; third, a structure lending itself to circuits of low relative radio-frequency resistance of high impedance, so that excessive energy will not be required to swing them through the necessary range of control voltages; fourth, fixed relationship between the various elements, irrespective of temperature or ordinary shock, so that the frequency to which the device as a whole is tuned will not be affected by relative changes of position; fifth, minimum undesired or "incidental" radiation from the various elements of the tube and its auxiliaries; sixth, a minimum of insulating material subjected to high-frequency fields. To these may be added the secondary requirements of demountability for replacement of filaments, facility in water cooling and avoidance of hot spots, and ease of tuning.

From the conventional approach these requirements are incompatible to a large degree. A high degree of control requires close spacing of cathode and grid, which leads to high interelectrode capacity. Rigid structure ordinarily means massive structure, which again leads to high interelectrode capacity. Water cooling systems tend to form effective antennae, leading to large stray power radiation. The broad purpose of my invention is therefore to reconcile these and other apparent incompatibles.

Pursuant to this general purpose, among the objects of this invention are: to provide a tube which is capable of producing many kilowatts of power at extremely high frequencies; to produce a high frequency generator of great frequency stability; to produce a high frequency amplifier and oscillator tube of relatively high efficiency, and particularly to produce such a tube wherein the losses due to undesired radiation from the tube itself are reduced to negligible proportions; to produce a high frequency oscillator and amplifier which may be tuned to operate at any desired frequency throughout a reasonably wide range; to provide a high frequency oscillator and amplifier which may be constructed with the high degree of accuracy required to meet the close tolerances demanded by the frequency of operation and maintain those tolerances under the changes of temperature produced by such operation; to provide an electronic tube of the character described which may be fully fluid cooled and wherein the cooling system does not introduce material parasitic radiation of radio-frequency power; to provide a high power oscillator and amplifier tube which is readily demountable for replacement of filaments; to provide means of density-modulating an electron stream at ultra-high frequencies, in order to produce extremely short bursts of electron emission occurring at peaks of the oscillation and of substantially uniform velocity, whereby the conversion of energy into high frequency power occurs at high efficiency; to provide a type of structure for high frequency electronic tubes which is of great flexibility, and which will, because of such flexibility, permit the construction of tubes exactly adapted to a large variety of powers and services; to provide a novel and effective method of tuning apparatus of the character described; and to provide a type of electrode support for high frequency electronic devices which is massive and rugged, and which, at the same time, does not introduce interelectrode capacities which either severely limit the frequencies upon which the device is operative or the power which may be developed at such frequencies.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself in any way to the apparatus of the present application, as I may adopt various other apparatus embodiments utilizing the method, within the scope of the appended claims.

The tube of my invention involves two basic concepts. The first of these comprises forming electrode supports of sturdy coaxial metallic cylinders which constitute a radio-frequency transmission line of at least one and preferably a plurality of quarter wavelength electrical links, with impedance irregularities at or near certain of the quarter-wave points, the electrodes themselves forming a portion of these transmission lines as considered electrically. Means are preferably provided for varying the position of the impedance irregularities to provide exact tuning, but this is not essential since, as will hereafter be shown, by a proper combination of the characteristic impedances of the quarter-wave sections and their terminating impedances, it is possible to make the radio-frequency impedance of the supports as viewed from the electrodes themselves extremely high, so that the overall effect is almost as though the electrode capacities together with the inductances required to resonate them were supported freely in the space within an unbroken metallic shield. This latter feature is secured by providing multiple coaxial line sections forming branch paths of greatly different impedance, certain of these paths acting as by-passes of negligible impedance at points where it is necessary that some circulating currents should flow, although D. C. insulation must be maintained, while at the same time maintaining the high impedance desired in other paths which would otherwise lead to radiation. By placing these by-pass sections at current nodes, the I²R losses therein may be made too small to need consideration.

The second fundamental concept comprises mounting on the ends of such supports, preferably in biaxially symmetrical configuration, one or a plurality of cathode-grid combinations which act, as before stated, as the termini of the transmission lines formed by the supports; mounting the grid opposed to an anode or other accelerating electrode in such manner as to produce an electrostatic field between grid and accelerator which comprises lines of force very sharply curved in the immediate neighborhood of the grid; and mounting the cathode in the region of sharpest curvature. One of the best ways of obtaining such a structure is to form the grid of pairs of cylindrical surfaces whose axes are parallel to the plane of the anode, and to make the cathode as a filament or strip having a flat or slightly concave face lying between the cylindrical surfaces of the grid. This results in the lines of force from accelerator or anode normally terminating in the grid structure, none of them reaching the cathode, from which emission is therefore normally suppressed. A few volts relative change in potential of the cathode, as referred to either accelerator or control grid, results in some of the lines of force from the accelerator terminating in the cathode surface, which is accordingly subjected to an extremely powerful field causing very large emission to the anode. The result is what may be termed an "explosive" type of emission, giving electron bursts of high density for very short periods at the peaks of the cycles. It will be evident that this structure results in a relatively high capacity as between cathode and grid, but the tuned transmission line support enables this capacity to be effectively resonated with an inductance as small as may be desired and still form a sharply tuned, high Q circuit whose high resonant input impedance may appear as resistive, capacitive or inductive, as the conditions of operation may require.

Referring to the drawings:

Fig. 2 is a transverse section of the tube of Fig. 1, showing the multiple coaxial grid-filament supports, and water connections for cooling the filament mounting, the plane of section being on the line 2—2 of Fig. 1.

Fig. 3 is a transverse section through the anode structure of the tube, the plane of section being indicated by the line 3—3 of Fig. 1.

Fig. 4 is an enlarged detailed view illustrating water-cooling connections from the exterior of the tube to the filament mounting.

Fig. 5 is a schematic sectional view through filaments, control grid, accelerating grid, boundary grid, and anode of the tube.

Fig. 6 is a sectional view through the grid support line, showing the radio-frequency by-pass between accelerating and boundary grids and the tuning mechanism for isolating the control grid and water cooling the same.

Fig. 7 is an enlarged detail showing the method of insulating certain of the supporting rings upon which the coaxial electrode elements are carried.

Fig. 8 is a section taken at right angles to the view of Fig. 1, and showing the anode-supporting, cooling, and tuning system.

Fig. 9 is a perspective view of the accelerator grid.

Fig. 10 is an elevation of the control-grid structure.

Fig. 11 is a sectional view, taken on the plane between the filament and grid structures, and showing in detail the filament support.

Fig. 12 is a fragmentary axial section taken on the line 12—12 of Fig. 11.

Fig. 13 is an elevation of the active face of the anode.

Fig. 14 is a fragmentary section of the anode, the plane of section being indicated by the line 14—14 in the preceding figure.

Fig. 15 is an elevation of the boundary grid.

Fig. 16 is a sectional view taken on the line 16—16 of Fig. 15, and showing a portion of the anode in elevation.

Fig. 17 is an elevation of one of the filaments.

Fig. 18 shows a modified form of coaxial line structure for grid-filament support in a tube generally similar to Fig. 1, but adapted for use either as an amplifier or an oscillator with inductive feed-back.

Figs. 19, 20, and 21 are sectional views through the tube of Fig. 18, taken on the lines numbered in accordance with the figures.

Fig. 22 is a longitudinal section through a tube built in accordance with this invention but wherein a cylindrical, rather than a radial filament-grid and anode arrangement is used.

Figure 23:
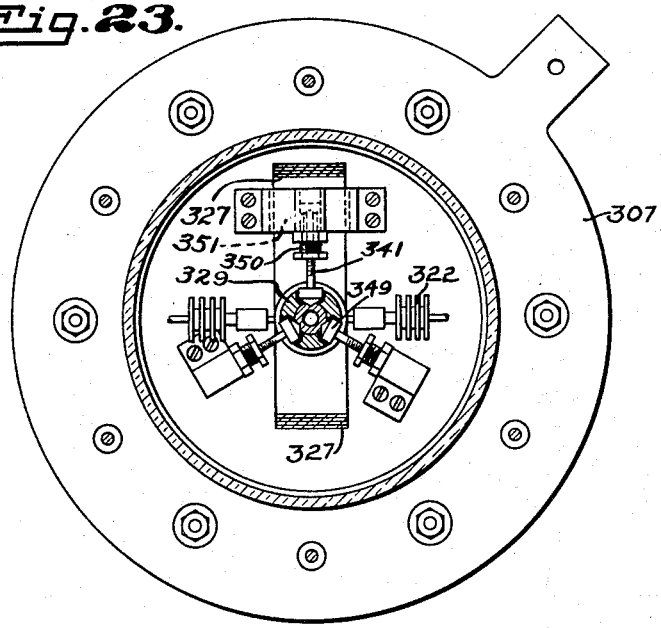
Figure 24:
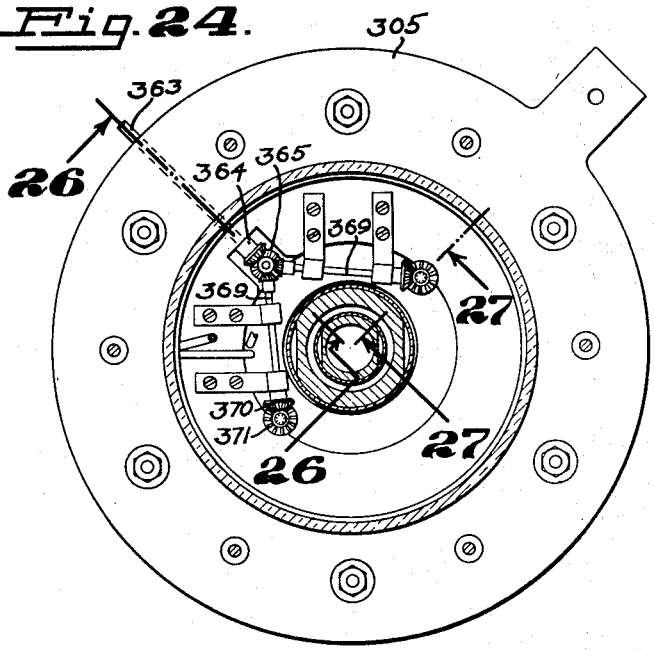

Figs. 23, 24, and 25 are transverse sections through the tube of Fig. 22, taken on the lines indicated by the respective numerals.

Figs. 26 and 27 are detailed views indicating the tuning mechanism for the tube of Fig. 22.

Figure 28:
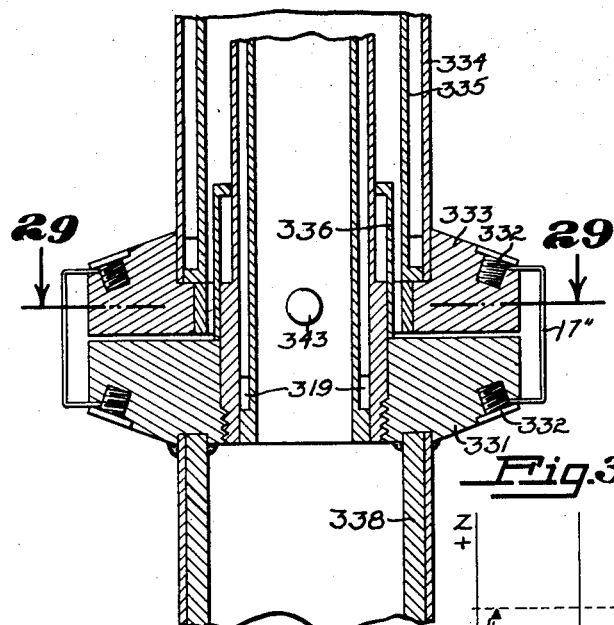

Fig. 28 is a longitudinal section on a larger scale through the filament support of the tube of Fig. 22.

Figure 29:
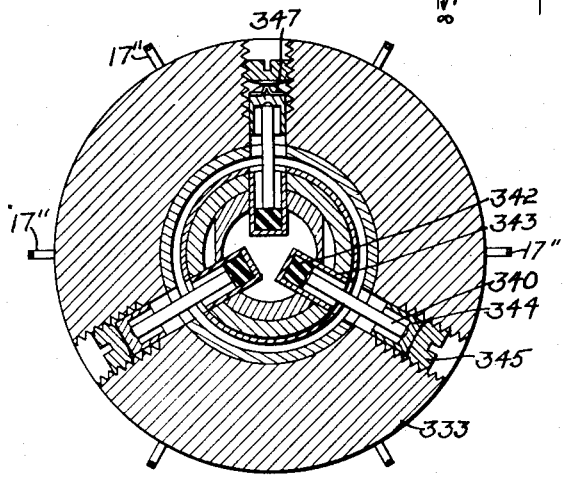

Fig. 29 is a transverse section through the supporting columns of the tube of Fig. 22, showing the construction of the centering mechanism, the plane of section being indicated by the line 29—29 of Fig. 28.

Figure 30:
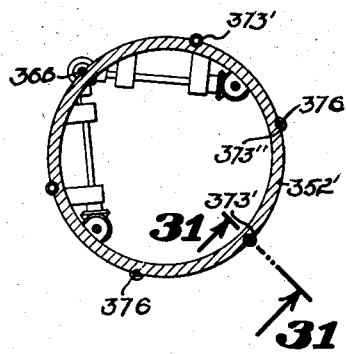

Fig. 30 is a sectional view taken on the line 30—30 of Fig. 22.

Figure 31:
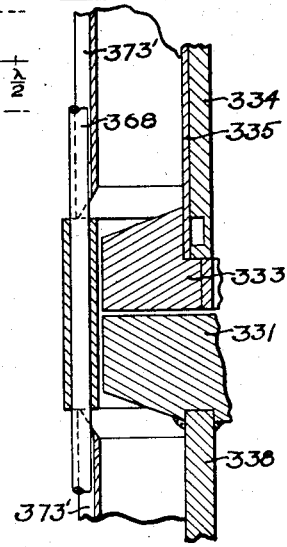

Fig. 31 is a fragmentary section taken on the line 31—31 of the preceding figure, showing the passage of the cooling pipe past the anode and between the two sections of the filament support.

Figure 32:
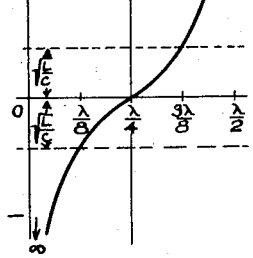

Fig. 32 is an impedance diagram for an open-ended, half wavelength section of transmission line.

In the ensuing specification the invention will first be described in its various aspects as applied to an oscillator tube of moderate power (i. e., approximately 10 kw. peak output at 20 to 40 centimeters wavelength). Following this there will be described two modifications illustrating respectively the application of the principles of my invention to a similar tube adapted for amplification or for generation of oscillations by inductive feed-back, and to a somewhat higher output device showing the principles as applied to a tube constructed with cylindrical rather than radial arrangement of electrodes.

Figure 1:
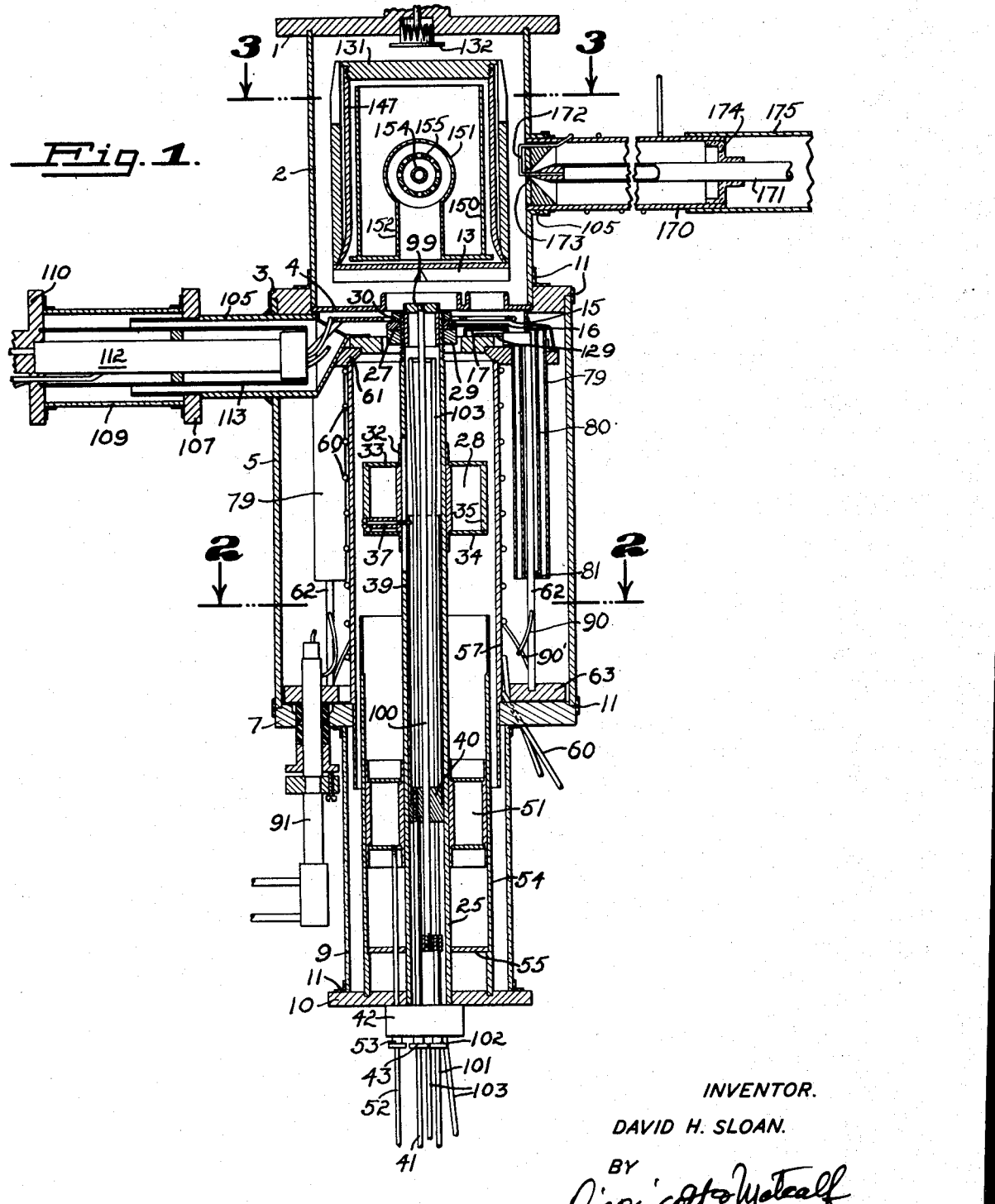
Fig. 1 is a longitudinal section through a high-frequency oscillator tube embodying my invention, the particular tube illustrated employing a radial arrangement of filaments and grids.

The tube shown in longitudinal section in Fig. 1 is of the demountable, constantly pumped type, as in fact, are all of those herein described, although the principles involved are not limited for use in such tubes. From the structural point of view the tube comprises a series of flanges connected by sections of tubing and held together in compression. From a practical point of view it is advantageous to have the flanges pierced for and held by circumferential bolts to hold the parts firmly in position when the tube is not under vacuum, but when in use the external air pressure tends to hold the entire device together, and the tube has actually been operated without the retaining bolts; these have therefore been omitted in the drawings since they add a further complexity of detail to an already complex structure.

Considering for the moment, therefore, only the external structure which forms the housing and which supports the remainder of the equipment, the tube comprises an anode housing flange 1 which is grooved to receive tightly the end of a tubular anode housing 2. This housing fits an internal recess or counterbore in an annular grid flange 3, clamping a boundary grid 4 between the housing tube 2 and the flange. A rabbet on the outer periphery of the flange 3 receives one end of a main support cylinder 5, whose other end terminates in another annular flange 7. All of the parts thus far mentioned are of metal, and I have found it convenient to make the flanges of steel, and the tube 5 also of seamless steel tubing, while the cylinder 2 may be either chromium or copper plated steel or solid copper, with copper preferred, since it forms a portion of a resonating circuit. Carrying on from the flange 7 is a glass or "Pyrex" cylinder 9 which abuts a terminal flange 10.

As has been mentioned already, the device as a whole is fully demountable. The ends of the tubes contact the flanges with smooth machine fits. The joints thus formed are sealed by applying thereto ordinary wide elastic bands as indicated by the reference characters 11, these bands being smeared before application with a small amount of vacuum line stop-cock grease.

It may be pointed out at this time that all of the structure thus far described with the exception of the terminal flange 10 is at D. C. ground potential, and as will later be shown in detail that the entire exterior structure is substantially at radio-frequency ground. This means that the insulating section formed by the cylinder 9 is not subjected to R. F. fields. It also renders easy the support of the device by any desired external means. Part of such support may be the connection to the pump, which is by a pipe 12 of relatively large lumen, welded or otherwise secured into the bottom of the anode housing 2. This pipe is not shown in Fig. 1, but is clearly visible at the bottom of Fig. 8.

The various elements which contribute to the electronic action of the tube are mounted within the envelope thus formed on columnar supports each of which has transmission line characteristics designed to meet its particular function. These elements are shown in schematic arrangement in Fig. 5, and comprise an anode 13, a boundary grid 4, an accelerating grid 15, a control grid 16, and a filamentary cathode 17.

Fig. 5 is drawn to a greatly enlarged scale and shows a fragmentary section of the elements cooperating with a single filamentary cathode. In the tube here shown six such cathodes are used and the portions shown of the other elements are repeated for each cathode. One advantage of the type of structure here shown is that the ability of the tube to supply power output varies almost directly as the number of filaments used, and that the changes required to add additional filaments are relatively minor. Tubes have been designed conforming substantially to the structure here shown with as high as twenty-four filaments, each with its attendant grid-anode structure, but since each of these assemblies is merely the duplicate of the others as far as performance is concerned, it is sufficient for the present to consider one only.

Considering, therefore, the portion of the elements shown in Fig. 5, the anode 13, preferably made of high conductivity oxygen-free copper, is operated at the maximum potential of the system, say 10 to 50 thousand volts positive. It is provided with a V-shaped groove 20 with its axis parallel to the axis of the filament. Next, proceeding toward the filament, is the boundary grid 4, which is also preferably made of oxygen-free copper. This is provided with an aperture surrounded by a collar 21 in accurate alinement with the groove 20 in the anode. Next in line is the accelerator grid 15, with a slot 22 which is somewhat narrower than the opening in the boundary grid, and which is operated at a potential above the cathode of from 5 to 20 thousand volts. All potentials mentioned are illustrative and relative only, since the actual values used will depend upon the size, power output and operating frequency of the device. Furthermore, modifications in design are possible whereby the functions of certain of the grids are combined, other electrodes are operated at ground potential, etc. Such modifications will be considered later; the purpose here is to show the application of the principles of my invention to the present tube.

The most important portion of the combination is the arrangement of the cathode-grid structure. The important features here are first, that the control-grid elements comprise parallel cylindrical surfaces, curved as they are presented to the filament. In the present case they are rods or wires, but they could be cylindrical surfaces formed as the edges of a slot in a flat plate without affecting their performance. Between these surfaces, and slightly back of the plane of their centers of curvature, lies the filament, which has a flat or preferably a slightly hollow ground face presented to the anode. It is convenient to operate the filament at ground potential (disregarding for the moment the slight voltage drop along the filament) and, for the powers here considered, to operate the grid 16 at 200 to 500 volts negative.

It will be seen that at the orders of voltages given the major fields are from the accelerator grid 15 to the control grid. As is well known, the lines of force constituting such a field terminate at right angles to the surfaces of the field-defining electrodes. It follows that in the region adjacent the cathode the lines of force emerge from the grid wires in the general direction of the cathode and then curve very sharply toward the anode in a direction nearly at right angles to their direction of emergence. There is also a fairly strong field between the control grid and the cathode itself, which is superimposed locally upon the field between the control grid and accelerator grid, and is directed toward, instead of away from the cathode. As a result of the interaction of these two fields none of the lines of force from the accelerator-grid normally terminate upon the surface of the cathode. Emission has therefore no tendency to leave the latter, since the space adjacent it is nearly neutral, with such weak field as exists therein directed toward the cathode.

As is the case with any grid-controlled tube operated through cut-off, when the grid swings positive some of the lines of force from the accelerator-grid which formerly terminated on the control grid now terminate on the cathode, and as the cycle progresses the cathode-control grid field weakens or even reverses, permitting emission toward the anode, and a space charge builds up in the region immediately in front of the cathode face which has the usual effect of limiting emission. The distinguishing feature here is that the region where the field is weak enough to permit such space charge effect is very shallow, so that even with the low velocities imparted to them by such relatively weak field the electrons can and do traverse it in a reasonably small fraction of a cycle.

The biasing potential between cathode and grid is so adjusted that emission can occur only for an instant at the cycle peaks, and cut-off may occur even before the first electrons emitted have traversed the space charge region. Furthermore, while in this region there is a maximum difference of velocity as between electrons, both by reason of differing initial velocities of emission and, more important, by reason of differing acceleration due both to phase of emission and field strength at various parts of the cathode surface.

The important point is that because the region is so shallow all of the electrons emitted do get through it before the cycle has advanced too far and, having traversed it, fall into the region of high potential gradient where acceleration toward the anode is very great; space charge effect is of no further moment, and they receive so large a portion of their final velocity that their differences of velocity in the initial region are immaterial.

It should be realized that while space-charge effect prevents some emission and decreases the acceleration of electrons emitted, it will not drive those which have been emitted back to the cathode nor prevent their reaching the anode. It follows that the space-charge region may be considered as a reservoir for emitted electrons. With conventional grid-cathode structures it is relatively deep, so that, at the frequencies and powers at which this tube is intended to operate, transit therethrough occupies a major portion of the cycle, and with the varying velocities obtaining while in this region the electrons straggle through to reach the anode in such varying phases that the density modulation of the stream is almost if not entirely lost.

With the arrangement of my invention, however, the space-charge region is so shallow that even the stragglers among the emitted electrons traverse it in less than a quarter cycle and instead of the density modulation of the electrons being lost they reach the anode in bursts of such power and suddenness and with such close velocity grouping that I have termed cathode-grid combinations of this type "explosive." The object of the design is to make the electron reservoir constituted by the space-charge region as shallow as possible, and in practice the ideal can be so far realized as to permit density modulation of electron streams at frequencies in the range of 1,500 megacycles, where in the past it has been necessary to use velocity modulation, involving larger and more complicated structures, to get reasonably effective results, even in smaller sizes and at much lower powers than those here contemplated.

When the tube here shown is used as an oscillator in the manner now to be described, the various potentials are so arranged and proportioned that the transit time of the burst of electrons is substantially one-half cycle. The anode 13 is in a tuned circuit, as is also the grid 16. The condition of oscillation then is that the potentials of the anode and the grid swing in the same sense, so that the grid reaches its peak of positive potential at the same instant as does the anode.

One of the results of the conformation of the electrostatic fields is a strong focusing action upon the electron bursts, and these bursts accordingly fall upon an extremely limited portion of the anode surface, substantially none reaching either of the intermediate grids. The anode area upon which the electron bursts impinge is that included in the V-shaped slot 20. The reason for this arrangement is to spread the area of impact and so increase the size and decrease the intensity of maximum local heating, while increasing the cross-sectional area of thermal conductivity by which cooling occurs, and also to insure that secondary electrons are not projected into regions of high field intensity which would accelerate them so that they, in turn, would cause serious heating effects.

It has already been stated that the transit time of the electron burst is one-half cycle of oscillation, and it follows that immediately after the electron burst has occurred the anode has started to swing negative. The electrons accordingly reach their maximum velocity at or about the plane of the accelerator grid—ideally, just as they pass the effective plane of the boundary grid 4. As the anode continues to swing negative they encounter a decelerating field, either in an absolute sense or, if still being accelerated by the D.-C. field, from the anode at least in comparison to the acceleration of the D.-C. field alone. In passing through this decelerating field the electrons are delivering energy to the anode circuit, and they are traveling at minimum relative velocity when they enter the slot 20. This slot acts in some degree as a Faraday space, and the electrons suffer little change in velocity or energy as they pass through it. Therefore their work is done and their transit time effectively over as soon as they have entered it.

Since the acceleration of the entire burst of electrons takes place with substantial uniformity they retain their close grouping at the time of impact, and since the impact occurs when the electrons constituting the burst have suffered maximum deceleration there is a minimum of energy wasted as heat and the oscillator consequently operates at relatively high efficiency.

For operation in the manner described the desiderata are that the control grid 16 and filament 17 should be effectively isolated from each other both as regards D.-C. and radio-frequency potentials, and should have an effective capacity sufficiently low so that it may be tuned to the desired operating frequency, or, in other terms, it must be capable of being connected in circuit with an inductance sufficiently small to tune to that frequency. The accelerator grid 15 must be insulated from the other elements to maintain its D.-C. voltage, but should be effectively grounded as regards radio-frequency potentials. The boundary grid 4 should also be grounded to radio-frequency and for convenience in operation and safety's sake should preferably also be grounded as regards D.-C. potential, as it is electrically continuous with the envelope. The anode should be free as regards both A.-C. and D.-C. potentials.

The various mounting and auxiliary means next to be described are designed to meet the desiderata as fully as possible. In this description terms such as "above" or "below" are used to indicate position as shown in Fig. 1. They have no other significance, as the device may be operated in any position.

Starting at the bottom of Fig. 1, with the flange 10, a high conductivity column or pipe 25 extends a major portion of the length of the entire device to the plane of the flange 3 and the boundary grid 4. This column is brazed or otherwise permanently secured into the flange 10 so as to be accurately concentric with the remainder of the tube structure and, of course, to be vacuum tight. At its upper end it is threaded to receive a grid-support ring 27, which is clamped between locking nuts 29 and 30, and an additional locking screw 31 (Fig. 10) is also provided for further security. The pairs of parallel grid wires 16 project from the ring 27 parallel to its radii, six pairs of grid wires being provided in the present design, the pairs being equidistantly spaced around the periphery of the ring.

Two sliders are mounted on the column 25. The upper slider 28 comprises a short section of tubing 32 surfaced to a sliding fit on the column 25 and shouldered at each end to receive discs 33 and 34 between which a short section of tubing 35 is clamped. The column 25 is provided in this region with a longitudinal slot for the passage of a screw 37 which engages a piece of tubing 39 sliding within the column. The tubing 39 terminates in an annular block 40, and an adjusting rod 41 is threaded into one side of the block and passes to the exterior of the tube through a gland box 42 and a "Wilson seal" 43. It is apparent that the position of the slider may be adjusted by sliding the rod 41.

A word as to the Wilson seal may here be in order, and in this connection attention is drawn to the showing at the lower right of Fig. 8. The seal proper consists of a normally flat washer 45 of synthetic or natural rubber, which is forced against a conical seat 47 by the internally conical edges of a gland 49. When the washer is unstressed the aperture therethrough is slightly too small for the rod 50 which it is desired to seal. The seal is lubricated with a small quantity of vacuum stop-cock grease. Such a seal is vacuum tight under conditions where other known types of packing would leak badly, since the differential pressure on the washer serves to make it hug the central rod more tightly and it remains tight whether the rod be subjected to rotary or sliding motion in either direction.

Returning to the general tube structure, the second and lower slider 51 is essentially similar in construtcion to that just described, except that its actuating rod 52 is mounted externally of the column 25 through the gland box 42 and Wilson seal 53.

The slider 51 makes a close sliding fit within a cylindrical conductor 54 mounted in the flange 10 accurately concentric with the column 25 and maintained in this concentric relation both by the slider 51 itself and by an auxiliary diaphragm or spacer 55. The tubing 54 does not extend the full length of the central column, but terminates a distance above the flange 7 which is somewhere in the neighborhood of one-eighth of a wavelength at the mean frequency for which the tube is designed.

Accurately coaxial with the column 25 and its surrounding conductor 51 is a third conducting cylinder 57, mounted on the flange 7 and extending below it for approximately one-eighth wavelength, so that the two conductors 54 and 57 overlap by a distance approximately equal to one-quarter wavelength of the average operating frequency of the device, wavelengths in this sense being used to mean the wavelength of the frequency transmitted along the two tubes as a coaxial transmission line. There is no metallic contact between the two conductors 54 and 57, and they are separated by vacuum so that dielectric loss does not occur in the space between them.

Column 57 is brazed or otherwise secured in the flange 7, is made of highly conducting material (preferably oxygen-free copper) and is preferably provided with a cooling system comprising a water pipe 60 coiled around and soldered to the external surface of the column. The ends of this pipe are brought out through the flange 7 at the right of Fig. 1.

The upper end of the column 57 carries an intermediate ring 61 which supports indirectly one end of each of the filaments 17. The other ends of these filaments are carried by a group (here six) of pipes 62 mounted in the annular interspace between the column 57 and the outer shell 5. The lower ends of the pipes 62 are mounted in a ring 63 which is bolted to and insulated from the flange 7 as is shown in Figs. 2 and 7. The ring 63 is counterbored at three equidistant points to receive insulating beads 64 of porcelain, lava, or other refractory insulating material which beads space the rings slightly from the flange 7. A cap screw 65 passes in turn through a clamping cap 67, a second bead 69, the ring 63 and the bead 64 to clamp the ring firmly to the flange. It should be noted that the potentials which this arrangement must withstand are of low frequency and are only those across the filament, i. e., the insulation need only be of sufficient value to withstand a few volts (three at 60 cycles in the instant structure) and the insulating material is not subject to dielectric heating from radio-frequency fields.

The actual filament mounting can best be seen in Figs. 11 and 12. Each of the tubes 62 carries an inwardly projecting L-shaped lug 70, and the inner ends of the lugs are provided with slots 71 for receiving the downturned ends of the staple-shaped filaments 17, the ends being clamped into place by set-screws 72. The inner ends of the filaments are clamped in an annular groove 73, formed in an inner mounting ring 74 which is supported on column 57 by the intermediate ring 61 before mentioned. The actual clamping of the filament ends is accomplished by pairs of set-screws 75 bearing on small blocks 77.

The pipes 62 are surrounded by open-ended cylindrical conductors 79, which terminate at the level of the upper end of the lug and extend down over the pipe 62 for approximately one-quarter wavelength and are supported by the ring 61. Within the conductors 79 are inner tubular conductors 80 of substantially the same length, open at their upper ends and mounted by their lower ends on the pipes 62 by means of conductive blocks 81. The concentric tubes 79 and 80 are both open at the filament end, being notched to clear the lugs 70 and also being provided with aligned holes to permit tightening of the set-screws 72. It will thus be seen that the only connection between the inner column 57 with its supporting rings 61 and 74 and the group of filament support tubes 62 is the filaments themselves.

These are shown in Fig. 17, and as will be seen are relatively short and rigid. They are preferably of pure tungsten and have a considerable degree of strength. It will further be seen that the support afforded their outer ends by the tubes 62 and lugs 70 is light and of small inertia and that the tubes 62 have relatively large resiliency. The filaments therefore are very unlikely to be ruptured by shock on the device as a whole, and there is ample flexibility to take up their expansion.

Each filament is preferably formed of round tungsten wire, one surface of which is ground flat or slightly concave. The diameter here used is 50 mils. The grinding is preferably performed in a jig which deforms the wire slightly in the longitudinal direction, so that the ends of the filament are ground a few thousandths of an inch thinner than is the central portion. This grinding forms the flat emitting surface of the filament, and if done with a relatively small wheel whose axis is maintained parallel to the length of the filament, it gives the slight hollow grinding which has already been stated to be advantageous. The effect of thinning the two ends, adjacent the point where the filament is clamped, is to give a greater current density at these points, with a consequent greater liberation of heat which compensates for the heat conduction to the clamping means and results in substantially constant temperature and substantially constant emission over the entire effective length of the filament. Being of pure tungsten, the filament retains a degree of resiliency even at its emitting temperature, and this, together with its resilient support, prevents buckling or change of plane of the emitting surface when in operation and keeps the electrical constants of the device fixed under such minor variations in operating temperature and expansion, and inequality in these factors as between the several filaments, as inevitably occur in practice.

Cooling for the support of the inner ends of the filaments is accomplished by conduction through the support rings 74 and 61 to the column 57 and thence through the cooling coil 60. Cooling for the outer supports is by circulatory system within the support pipes 62 themselves. A small water pipe 90 enters the side of each of the support pipes 62, and extends axially within it to a point adjacent the lug 70, so that water entering this pipe will be squirted against the inner end of the lug. From there it returns through the pipe 62 externally of the pipe 90 to the bottom of pipe 62, where the end 90' of the next pipe is connected to carry the water to the next filament support, circulation thereby occurring through each of the support pipes 62 in succession.

The supply for this circulatory system is through a fitting designated by the general reference character 91, comprising coaxial pipes 92 and 93 which connect respectively to the two ends of the system. The outer of these pipes is permanently secured to the support ring 63 (see Fig. 4). The fitting 91 passes through the flange 7 and is insulated therefrom by insulating bushings 94 of steatite or other refractory between which is a compressed rubber washer 95 forming a vacuum-tight seal. A connecting lug 97 for connecting one filament supply lead is mounted upon the fitting 91, and the ring 63, and the circulatory system comprising pipes 90 and 62 all constitute the conducting system for supplying the filament current. The return circuit is through the column 57 and the flange 7, to which a second connecting lug (not shown) is attached.

There are two other features comprised within the filament-grid structure and their supporting systems. The first of these is a sliding plug 99 mounted in the end of the inner support column 25, and adjustable as to position by means of an operating rod 100, and an offset extension rod 101 passing through a Wilson seal 102 in the gland box 42. The second is a cooling pipe 103 which extends substantially the full length of the inner column 25 and is soldered thereto adjacent its upper end for better heat transfer.

We are now in a position to consider the electrical characteristics of the filament-grid structure in view of the desiderata above set forth, and it is believed appropriate to do this at this point, since the same principles are involved in the supports for the remaining elements of the device and the explanation of all will be simplified if these principles are in mind. The necessary separation of the elements as regards D. C. or low frequency potentials have already been accounted for. There is no metallic connection between the grid-support column 25 and the filament-support system comprising the column 57, and the support pipes 62. Remaining to be accounted for is the impedance relationship between the grid and filament members, and this is dependent upon the impedance of the coaxial transmission line formed by the inner and outer columns 25 and 57 and the coaxial conductors associated therewith.

The impedance characteristics of transmission lines whose lengths are of the same order of magnitude as the wavelengths of electrical oscillations transmitted thereby are now well known, but they are restated here for convenience in the explanations that follow. Most of them can be derived from the impedance diagram of a half-wave line open at the output end, as shown in Fig. 32, which indicates such a line diagrammatically, and shows the approximate curve of relative impedance looking into any portion of the line from the right, resistance of the conductors themselves being assumed to approach zero. Extremely short sections show a high capacitive reactance, which falls to the characteristic impedance of $$\sqrt{\frac{L}{C}}$$

of the line at the ⅛ wavelength point, and to zero at the quarter-wave point, i. e., a quarter-wave open-ended line acts as a dead short. From this point on the apparent reactance is inductive, rising again to the value of $$\sqrt{\frac{L}{C}}$$

at the ⅜λ point and approaching infinity at ½λ.

The same diagram may be taken as representing the impedance of a shorted-end line if the origin be taken at the nodal or quarter-wave point, which appears as a short when looking into the line. For short sections the reactance is small and inductive, it rises to $$\sqrt{\frac{L}{C}}$$

at the ½λ point and approaches infinity at λ/4. Since this appears as an open circuit, increasing the length of the line repeats the portion of the diagram shown at the left of the nodal point.

Stated in another manner, a quarter-wave open line or a half-wave shorted line appears much like a series resonant circuit, while a quarter-wave shorted line or a half-wave open line appears like an anti-resonant or parallel resonant circuit.

The only other relationship necessary to the understanding of the present invention is that the characteristic impedance of a quarter-wave line is the geometric mean between its input and closing impedances. The short-circuit and open-circuit conditions are, of course, merely special cases of this general relation.

The lines comprising the element supports of the tube of my invention may be considered from a number of aspects, all depending on the general relationships above set forth, but in the treatment here adopted they are generally considered as divided into sections of quarter-wave length, or thereabout, as this is believed to lead to the simplest explanations.

We are interested in the impedance of the grid-filament support line as viewed from the grid end, but this impedance is dependent upon the terminating or output impedances of the various sections and, therefore, in order to determine what the grid-end impedance will be, we must consider the various elements, section by section, starting from the outermost or lower end of the tube as shown in Fig. 1.

From this aspect the first section of the structure is the section including the adjusting rods 52, 41, etc., the flange 10, and the section of the tubular conductor 54 illustrated as below the end of the column 57. Electrically this portion of the structure is a single conductor, and viewed from its upper end constitutes an end-fed antenna. It is preferable that its length be of the order of one-half wavelength at the operating frequency of the device, in which case its effective impedance $Z_2$ will be in the neighborhood of 1,000 ohms. If its length be reduced to one-quarter wavelength its effective input impedance will likewise be reduced to the neighborhood of from 50 to 100 ohms, the quarter wavelength condition being the least desirable in practice. This antenna is considered as being fed by the coaxial transmission line comprising the tubular conductor 54 as the inner element and the column 57 as the outer element. With the spacing shown such a transmission line will have a characteristic or surge impedance $Z_0$ of about 10 ohms, and as has already been stated the length of this section of transmission line is approximately λ/4, where λ is the wavelength at the frequency of operation. If we consider the quarter-wave condition to be fulfilled exactly the impedance looking into the coaxial line from the grid end will be $$Z_1 = \frac{Z_0^2}{Z_2}$$

If the antenna section of the system has an impedance of the order of 1,000 ohms, the characteristic impedance of the line being 10 ohms, the input impedance of the line will therefore be 1/10 of an ohm. This low impedance therefore becomes the closing impedance of the section of line immediately preceding it. From one point of view it acts as a radio-frequency by-pass between the inner conductor 54 and the outer conductor 57, so that viewed from the input end, at radio-frequencies the cylinder 54 and outer column 57 appear as a single conductor, and form, in connection with inner column 25, a single radio-frequency transmission line considered as fed from the grid-filament end through a slight impedance irregularity where the inner cylinder 54 terminates. Its effect from another point of view will be considered later.

Even if the conditions as to impedance of antenna and length of the coaxial line constituting the column 57 and cylinder 54 are not exactly met the result will be substantially the same. The antenna impedance can easily be kept above 100 ohms, making the impedance looking into the quarter wavelength line 1 ohm. If the length of the line section is not exactly one-quarter wave, but is still materially greater than one-eighth wavelength, the input impedance will still be low in comparison with the characteristic impedance of the line, and although more power will escape than if optimum conditions are met the amount of power wasted by such undesired radiation will be very small.

The section of the inner line comprising the cylinder 54 and column 25 terminates in the slider 51, which, as it is of large area and makes good contact with both conductors, may be considered as of zero impedance. This section may be tuned to exactly one-quarter wave by moving the slider. Due to the spacing between the two conductors the characteristic impedance of this section of transmission line is high, and if the resistance of the line were zero the input impedance would be infinite. Actually it may always be made to exceed 100,000 ohms and under optimum conditions may reach ten times this value. This section therefore forms a tuned radio-frequency choke of extremely high impedance interposed between the filament-grid structure and the outside world, and the impedance involved is so high that practically all energy reaching it is reflected back to its source.

What actually happens can be expressed more nearly in the terms of low frequency power line transmission if we think of the antenna as a load which is fed by a line terminating immediately above the top of the column 54. Current fed to this line from the central column 25 must proceed down the column, across the slider, and back to the top of the conductor 54, since owing to skin effect none will flow transversely through the wall of the conductor. In so flowing the current meets an enormous impedance—say 100,000 ohms. From there the line continues down the outside of conductor 54 to the antenna and back within the column 57 to the terminus above the top of conductor 54. This latter length of line, including the load imposed by the antenna, has an impedance of, say 1 ohm, and since the voltage available at the termini of the line will divide itself across this low impedance and the high impedance line section in series therewith in the proportions of the magnitudes of those impedances, and since the current flowing at the input points of the respective sections is the same, it follows that the energy delivered to the respective impedances will also be in proportion to their magnitudes, and only $1/100{,}000$ of that delivered to the line will be transmitted to the antenna to be radiated thereby—still less if optimum conditions are met.

From still a slightly different aspect, the small and largely resistive impedance offered by the outer line is at a current node. We therefore have a very small current flowing, and therefore the value of $I^2R$ is vanishingly small, the R in this case being the apparent input impedance of the outer line and $I^2R$ (practically) the energy radiated.

From whatever aspect the matter be considered the result is the same: The sections of the transmission line above the current node terminate in what is equivalent to an open circuit, just as would a low frequency line connected across an ordinarily good insulator. There is some consumption of power, which can be neglected in further consideration, (as in the case of the insulator) and the succeeding sections can be treated as if they terminated at this point in an infinite impedance. It should be noted, however, that at the frequencies we are considering substitution of an insulator for the line sections would drop the impedance to a finite value and introduce large losses through radiation and dielectric phenomena.

The design problem to be met, therefore, is the design of a structure which, when terminated by an impedance approaching infinity, will have the properties of an anti-resonant circuit as viewed from cathode and grid. This structure is provided by two additional quarter-wave sections of the same line.

The first of these sections extends to include the upper slider 28, and its design is such that its electrical length may be changed in opposite sense to its physical length; i. e., such that it may be "fitted in" beneath the section above it even when the length of the upper section increases with decreased frequency of operation or vice versa.

This effect is obtained by means of the irregularity introduced by the low-impedance line section constituted by the slider 28. From the top of the high impedance section already described to the slider is a length of relatively high impedance line of less than ¼ wavelength which therefore appears as a capacity variable from zero to some small value as the slider is moved to change its length from zero toward λ/4. To this is connected the relatively great capacity of the slider portion of the line about ⅛ λ in length, but presenting an effective capacity many times as great as and apparently in parallel with that of the lower section, so that moving the slider to change the length of the section below it changes the apparent capacity as viewed from above relatively little. Therefore a very short length of the high impedance line above the slider is all that is necessary to tune this effective capacity to resonance, thus completing the quarter-wave section of line and bringing the node or quarter-wave point of the composite section a small distance above the upper slider face. The distance between the slider and the node will vary with frequency, of course, but only slightly with the position of the slider.

It has already been pointed out that the node is effectively equivalent to a short-circuit, and hence, since by moving the slider we may move the position of the node, by so doing we may tune the uppermost section of the line including the filament and grid. We have made that portion of the line below the slider and above the impedance loop relatively ineffective in tuning, so that we have an "elastic" or extensible quarter-wave section of line.

The final or grid-filament section may thus be resonated or otherwise tuned to give optimum operating conditions. In the case of Fig. 1, where capacity feed-back between anode 13 and grid cap 99 is used, the desired tuning of this section must provide a capacitive reactance. This is obtained by making the grid-filament section slightly longer than one-half wavelength or, in other terms, tuning it to a slightly lower frequency than that of the desired oscillation, so that as viewed at grid and filament it presents a small anti-resonant capacitive reactance. Under these circumstances the filament-grid system appears as a capacity in series with the capacity between the grid structure and the anode, and this latter capacity is adjustable by varying the position of the cap 99. When, therefore, the potential of the anode swings, the grid will assume a potential with respect to the filament (and ground) which is intermediate between cathode and anode potential, and which bears the proportion to the total potential between anode and filament that the effective series capacity between anode-grid and grid-filament bears to the apparent capacity between filament and grid. In other words, the arrangement is essentially a capacitive voltage divider which swings the grid potential in the same sense that the anode potential swings, and in fixed and predetermined proportion thereto. Since the criterion for oscillation of the device is that the grid and anode should swing in the same sense and in step, the result is a highly effective capacity feed-back which is under control either by varying the actual capacity coupling with the cap 99 or by varying the effective resonant input capacity of the grid-filament circuit by varying the position of the slider 28.

By the use of the two sliders the device is thus given its very considerable tuning range. The lower slider 51 brings the current node to the point where the antenna is fed; the upper slider 28 moves the nodal point immediately above it and thus tunes the filament-grid section. The actual point of importance is that by adjusting the position of the sliders the effective resonant impedance of the filament-grid combination may be made to assume any value which may be desired, since the node above the slider 28 may be moved near enough to the rather large lumped cathode-grid capacity to embrace between the node and that capacity the exact small line inductance required for tuning it. In actual practice the effective impedance will be made capacitive and small in comparison with the physical grid-cathode capacity, but it might, if desired, equally well be made inductive or resistive. Furthermore, since the effective resistances in the circuit are extremely low, and the losses are also small even though the circulating currents may be large.

A system of transmission lines, chokes and by-passes similar to that used in the filament-grid circuit is employed across the filament to prevent transmission of energy to D.-C. insulation and to prevent filament damage by R.-F. currents. The actual ground point on the filament circuit is the flange 7 on the outer casing 5 of the device. This, however, is unimportant and the effect of the transmission line arrangement may be considered as though the ground point were at the inner end of the filament. This may be considered as terminus of a quarter wavelength coaxial transmission line comprising the tubular conductors 79 and 80, which is open at its lower end, terminating in a high impedance. The transmission line impedance is again low, being of the order of, say 5 ohms, and the line therefore forms a negligible series impedance as before, acting as a by-pass to the inner conductor. This, again, is a quarter wavelength line with the pipe 62 at its inner conductor, terminating in a dead short, and therefore offering very high impedance. As the potential imposed across this impedance is merely that which can build up across the short filament, amounting to a few volts at most, the escape of power through the filament support may be neglected, and the high impedance effectively in series with the filament prevents circulation of R.-F. currents which might otherwise cause hot spots and burn-outs.

We are now ready to consider the mounting of the remaining elements, i. e., the accelerator grid, boundary grid, and anode, which elements are shown in elevation in Figs. 9, 15 and 13, respectively. The accelerator grid is mounted from a side tube 105, which is welded to project through the wall of the housing 5 immediately below the flange 3. This side tube carries at its outer end a flange 107 which is surfaced to receive the tubular glass insulator 109, and the latter, in turn, carries a terminal flange 110. This structure may best be seen in the enlarged detail view of Fig. 6. As in the case of the main tube envelope, the tie-bolts which hold the structure together are omitted, but it will be understood that it is assembled in the same fashion as is the main envelope with ground surfaces reenforced by greased rubber bands or gaskets 111 which form the seals. Two tubular conductors are fixed to and project inwardly from flange 110. The inner conductor 112 is spaced from the outer conductor 113 and is held accurately concentric therewith by an annular spacer 114. The accelerator grid 15 is supported from the inner member by a tubular bracket 115, the end of which fits within the conductor 112 and is rigidly secured thereto. A cooling pipe 117, bent into a ring to surround the accelerator grid, has its ends brought down parallel to the support bracket 115 and enters the inner conductor on either side thereof, the ends of the pipe passing into the inter-conductor space distally of the spacer 114 and emerging through the flange 110. A tuning slider 119, which nearly fills the space between the inner and outer conductors and does not make actual contact therebetween, is operated by means of a hook 120 whose end projects through a longitudinal slot in the conductor 112. A control rod 121 is threaded to the end of the hook and emerges through a Wilson seal 122.

The supporting bracket 115 and cooling tubes 117 are carried up to the interspace between the control grid and the boundary grid through an angular fitting or shield 125, which passes through a notch 127 cut in one side of the filament support ring 61. This construction is shown in Figs. 1, 6 and 11, each of these figures showing sections of the shield. The shield is electrically continuous with a pan 129 overlying and contacting the filament support ring 74 and slotted immediately above the filaments, which forms an additional shield or barrier to separate completely the anode and control-grid sections of the tube except at the points where intercommunication is necessary or desired. The shield and pan therefore form one terminus, and the accelerator grid and cooling pipe 117 form the other terminus of the radio-frequency transmission line comprising the side tube 105 and the tubular conductors 112 and 113.

From what has gone before it is believed that the operation of this arrangement will be readily apparent. Again we have an antenna system comprising the control rods 121 and cooling tubes 117, plus the projecting end of the conductor 113, which is fed by and offers a relatively high impedance to a quarter wavelength transmission line of low impedance formed by the side tube 105 and the conductor 113, and there is accordingly a radio-frequency by-pass between the grounded outer case 5 and the tube 105 of the conductor 113. Within this there is another series section of transmission line comprising the conductors 112 and 113 and terminating in a short formed by the spacer 114. This inner line is tuned to a quarter wavelength by means of the slider 120, which acts as a loading capacity and increases greatly the electrical length of the line. In practice this slider is moved back to a point from which the line appears as a very large inductance at the operating wavelength. The proper point is that at which the remaining inductance and capacitance of the line, considered from the grid end, make it just a quarter wavelength from the inner end to the shorting spacer 114, forming a very high impedance at the shield where the grid 15 and cooling tube 117 are supported, and preventing any appreciable power being transmitted past this point to be radiated. The capacity of the grid 15 to the boundary grid 4 is large, and that to the control grid 16 is small; there is little coupling tending to swing the accelerator grid 15, and it consequently tends to maintain very nearly zero R.-F. potential.

As has already been described and as shown in detail in Fig. 16 the boundary grid 4 is firmly clamped between the flange 3 and the anode housing 2, and is therefore physically and definitely at the ground potential of the housing. The boundary grid and the anode face 13 again form the termini of a resonant line, comprising the housing 2 as its outer conductor and a cylindrical anode body, designated by the general reference character 130, within the housing. This resonant line is one-half wavelength long, and may be considered as terminating between the inner face of the flange 1 and the end 131 of the anode body. This will be recognized as an open-ended half wave line, and therefore of extremely high impedance when viewed from either end.

The construction and method of support of the anode body are best shown in Fig. 8. The support is from the mid- or quarter wavelength point of the anode, i. e., at a potential node, so that there is little tendency for power to escape from the support structure. Such tendency as there is for power to leak from the support point is suppressed by either or both of two methods. First, and preferable in the cases where the tube may be predesigned to operate at a fixed wavelength, is a movable plate 132 mounted on the sliding rod 50 of the Wilson seal first described, and making contact with the flange 1 by means of a spring skirt 133. This may be adjusted to bring the node of the resonant line accurately at the point of support. This method of preventing direct radiation from the anode was adopted in the first of these devices constructed. It was quickly found, however, that the plate 132 was more useful as a tuning device, and therefore the principle of transmission-line-choke support was again employed to prevent power escape. In the construction then adopted and here shown a side tube 140 of relatively large diameter is welded at substantially the midpoint of the anode housing 2. The side tube carries a metallic flange 141, with a glass insultor tube 142 fitted against it and in turn carrying a terminal flange 143. Through this terminal flange passes a pipe 144 which projects through a pass hole 145 in the side of the anode housing and on the end of which the anode body is attached. The action here will be described following the mechanical description of the anode, as the expedients adopted are predicated upon the necessities of the mechanical structure.

From the electrical point of view the anode body is a simple cylinder with closed ends. Its complexity, as shown in Fig. 8, is due primarily to the provision for circulating cooling water within it, and to the provision of what may be termed a "rough tuning" device.

Owing to the necessity for providing cooling the body itself must be water-tight, and accordingly it is constructed of a flared cylinder 147, to the flared end of which the anode face 13 is hard-soldered. The other end of the cylinder is closed by a threaded disc 149.

The supporting pipe 144 enters the flared cylinder 147 through an aperture in the side thereof. The end of the pipe is threaded into a boss 148 on an inner baffle cylinder 150, which boss is soldered to the inner wall of the cylinder 147. The boss 148 extends internally to form a cylindrical chamber 151, which connects by a side pipe 152 through the end 153 of the baffle cylinder, so that water introduced through the pipe 144 is discharged directly against the active face 13 of the anode, and thence is forced around the exterior of the baffle cylinder to reenter its open end. It can then return within the cylinder to enter the open end of a return pipe 154, which is mounted concentrically within the pipe 144 by means of a perforated cap 155 which fits over the end of the pipe 144, its lower end passing out through the discharge chamber 151. The cap compresses a rubber gasket 146, sealing the joint between the pipe 144 and the anode body to make it water and vacuum tight.

The upper end of the pipe 154 is centered in the pipe 144 by means of a metal bellows 157 which is sealed to both pipes and permits differential expansion between the two. Water is introduced into the pipe 144 through a side pipe 159, and its course can be traced by the arrows in the drawings through the outer pipe, the perforations in the cap 155, the side pipe 152, and thence around the baffle cylinder 150 and back through the central pipe 154.

The action of the mounting follows the principles already set forth, although the application is somewhat different. A disc 160 is connected to the flange 141 both electrically and mechanically, and carries a cylinder 161. The pipe 144 and the cylinders 140 and 161 form a transmission line one full wavelength long. Electrically this might equally well be a half wavelength line, but additional space is needed for the insulating cylinder 142, which must withstand the full D.-C. anode potential of 20,000 volts or more. The length of this section is measured from the anode and its housing, and the impedance at its outer end is very high, so that looking into it from the anode the impedance is also very high.

This high impedance is connected in shunt across the line formed by the anode body 130 and anode housing 2 very near the nodal point, where the impedance of the latter line is low, and accordingly a very small portion of the current flowing at this point will take the high impedance path to the outer world.

In other terms, the full wave line is connected so near the node of the main anode oscillator circuit that only a few volts are effective across its termini, and therefore very small currents will tend to flow therein, representing a power loss of $V^2/Z$ where V is the small input voltage and Z the large input impedance. Moreover, since the line is one wavelength long, only the small voltage V will be effective to cause radiation from the radiating system constituted by the end of the line. It should be noted, however, that by deliberately unbalancing the anode resonator by means of the plate 132 the support system can be converted to a horn antenna which can be made to radiate as much high-frequency energy as the device will produce.

It will be noted that the arrangement described leads to and permits a new type of cavity resonator; i. e., one wherein various portions may be operated at different D.-C. potentials, so that D.-C. accelerations can occur while electrons are within the resonant cavity. Such acceleration is not always necessary or desirable it is true, but there are occasions where it is useful, and so far as I am aware, none of the various constructions hitherto suggested or employed permit it.

It has already been stated that fine tuning of the anode resonator can be accomplished by means of the disc 132. Greater changes in wavelength or operating frequency can be secured by placing a cylindrical shell 162 around the anode body. The effect of such a shell is twofold, since it increases the capacitance of the line formed by the body and the housing, thus tending to increase wavelengths or decrease frequency, but it also serves to decrease the inductance, with opposite effect. In a device of approximately the proportions shown, however, the effect of decrease of inductance is more pronounced than the effect of increase in capacitance, and hence the overall effect is to raise the frequency of operation of the tube. The extent of the effect produced by the shell may be increased by chamfering the end, where the effect on the capacity is greater than on the inductance. Because of possible differential expansion the shell is solidly secured to the anode body only at the anode end, contact with the opposite end flange being made frictionally by resilient fingers 163 formed by slotting the end of the cylinder 162 longitudinally as shown.

Radio frequency power developed in the anode circuit may be withdrawn by a variety of means. A preferable one of such means supplies power to a transmission line comprising a cylindrical conductor 170 welded or otherwise sealed to the side of the anode housing, and a central conductor 171 which terminates in a coupling link 172 entering the side of the anode housing through an aperture 173 and bent parallel to the axis of the anode body substantially at the potential node (and current loop) of the anode resonator. It is convenient to make the link 172 of small-bore metal tubing so that it may be water cooled by liquid carried in through the central conductor 171. In this case the tubing may be brought out of the anode resonator as shown, and coiled around and soldered to the outer conductor of the line 170 to cool it also. The vacuum seal for this section of the transmission line is provided by means of a quartz bushing 174 cemented to both inner and outer conductors. From this point on the coaxial line may either be continued, or it may terminate effectively in an antenna as shown. Where the line section is terminated in an antenna it is advantageous to provide a slip-joint 175, sealed by a greased gasket 177, by means of which joint the impedance of the line may be matched to the antenna. It is also advantageous to provide a vacuum tight slip-joint 178 whereby the coupling to the line may be varied.

Obviously the output line and its appurtenances may be varied to suit the purposes for which the tube is used. For instance, if a horn antenna is being fed, considerable advantage is obtainable by substituting a solid closure for the bushing 174 and terminating the inner conductor in vacuo. Such variants are not directly relevant to the present invention and are not here shown.

In connection with the water cooling as supplied to the coupling link, as well as the other water conductors, it will be understood that in each case the metal pipe or tubing will be carried only so far beyond the exterior of the device as a whole as is desirable in order that they may serve as conductors, antennas for loading the various by-pass-choke combinations, etc., and that beyond this point rubber or other insulating tubing will be used.

Fig. 18 shows a modified form of my invention in which the principles already developed are utilized in a tube designed for amplification or inductively coupled oscillation at a fixed frequency. The anode structure, designated by the reference character 13' is enclosed in an anode housing 2', similar to that used in the tube of Fig. 1, and therefore shown in fragmentary form only. The envelope comprises the flange 3', which is built with a comparatively deep skirt. This is followed by an insulating cylindrical housing section 200, a control grid flange 201, another short insulating section 202, and a filament support flange 203 in the order named. The flange 203 is dished downwardly, and through it passes the main central filament support column, which comprises an outer tube 204 and inner tube 205, the ends of which are set in a counterbore and soldered or welded to a flange 207. Against this flange abuts an insulating gasket 209, and the end-plate 210 of the tube is held between this gasket and a second gasket 211 by means of a clamping ring 212 and tie-bolts 213, thus completing the outer envelope of the tube.

In this case the central supporting column holds the outer, instead of the inner ends of the filaments, which are set in a terminal ring 214. Two sides of the inner tube 205 of the column are flat, as is shown in the cross-section of Fig. 19, and indicated by the reference character 215. The spaces formed between the inner and outer cylinders acts as a conduit for the cooling circulation, which is led into and out of the channel thus formed by the pipes 217, 217' respectively, these pipes entering at the plane of a ring 219 which also carries a connecting lug 220 for the filament lead. The two channels 215 are connected at the top of the column by an annular groove 221.

The inner ends of the filaments 17' are supported in substantially the same manner as in the tube of Fig. 1, upon L-shaped lugs 222 carried on the ends of support pipes 223. These tubes extend the full length of the column and emerge through the end-plate 210. As in the former case, each is supplied with an inner pipe 224, which carries water from the bottom of a preceding one of the pipes 223 and projects it against the lugs, the circulating water returning to the bottom of the pipe 223 outside of the inner pipe, thence to be carried to the next pipe in the system. Between the pipes 223 and the inner cylinder 205 of the central column is mounted a cylindrical conductor 225 which is three-quarters wavelength long and terminates closely adjacent the filaments. Its lower end is closed by a conducting disc 227, supported by and spaced from the bottom flange 210 by both a tie-bolt 229 and a spacer pipe 228, with which the disc 227 and the flange 210 are electrically continuous, so that they form the other end of the filament circuit, the flange 210 being provided with a lug 230 for connecting the filament lead. The end flange 210 also carries a conducting cylinder 231, which is a quarter wavelength long and terminates slightly below the disc 227.

As in the previous case the water pipes and connecting lugs form a high impedance antenna, fed by a low impedance quarter-wave line comprising the conductors 205 and 231 which give it negligible series impedance and so form a by-pass which makes the tube 231 effectively continuous with the tube 205 at high frequency although insulated against filament supply frequency and voltage. The tube 231, together with the water pipes 223 and spacer pipe 228 form a closed end quarter wavelength line, presenting a high impedance when viewed from the filament end.

A similar series-line by-pass effect to that offered by the lower quarter wavelength section is offered by the upper three-quarter wavelength section formed by the conductors 205 and 225, and in like manner also the filament-support pipes 223 form the inner conductor, and the three-quarter wavelength cylinder 225 forms the outer conductor of a three-quarter wavelength line, closed at the end, and offering very high impedance. R.-F. transmission from the internal or filament-support structure is therefore prevented as before.

The grid 16' is supported at the top of a cylindrical column 232, borne by inner extension 233 of the grid flange 201. In this case, as is shown in Fig. 20, the grid takes the form of a flat plate in which the grid apertures are slots whose rounded edges form the cylindrical surfaces to give the proper curvature of the field. A quarter wavelength series-line by-pass and choke is formed by a tubular skirt 234 mounted on the inner column 204. In this case the grid-filament circuit is brought to exact resonance, the closed end, three-quarter wave transmission line comprising the skirt 234, cylinder 232 and the grid 16' and filament 17' themselves being tuned to exactly three-quarter wavelength. This tuning is done by sliding the skirt 234 on the inner column to get the final exact adjustment which gives the necessary high impedance at the grid. The adjustment is made by means of a concentric water fitting comprising an external pipe 235 and an internal pipe 235' which circles and cools the skirt. The outer pipe emerges through a Wilson seal 236, so that the skirt can be adjusted using the fitting as a handle.

Tuning with a slider of this type, which in itself is practically a quarter wave choke, has the great advantage that the junction between slider and its supporting column necessarily comes substantially at a current node, and accordingly there is much less difficulty with heating at the sliding contact than where such contact occurs in the vicinity of a current loop.

In this case the grid 16' is operated at radio-frequency ground, and may itself be considered as a boundary grid terminating the grid-filament line, while it is the filament which swings in potential with relation thereto. The anode boundary grid and accelerator grid are combined in a single element, comprising a relatively thick plate 237, with apertures 238 for the passage of the electron bursts as illustrated in Fig. 21. The quarter-wave, open-end by-pass line section between control grid 16' and boundary-accelerator grid 237 is terminated at the interspace between the two, and comprises the space between the cylinder 232 supporting the grid 16' and a short length of tubing 239 which is mounted on annular spacers 240 and 241 on a cylinder 242 fixed to the interior surface of the flange 3'. Another annular spacer 243 within the cylinder 242 carries an upwardly extending skirt 244 which terminates a small distance below the by-passing line 239. Another short cylindrical section of conductor 245 is mounted concentrically with the grid column 232 within the flange 233. This conductor acts as a part of a choke, but its primary function is to displace the point of radio-frequency stress from the seal.

Again proceeding from the lower end of the device upwardly the section comprised of the conductors 232 and 245 is a closed-end choke, preferably quarter wave, offering high input impedance to the section above it. Feeding into this high impedance section is an open-end, quarter-wave blocking or by-pass section comprising conductors 244 and 232, and making these conductors electrically continuous, so that conductors 242 and 244 become the high impedance closed-end quarter wavelength line into which the control grid-accelerator grid section feeds. This impedance gives the grid-accelerator section, as an open-end, one-quarter wavelength line, negligible impedance, and effectively shorts the two grids at radio-frequency, although they are insulated against their D.-C. potential difference.

The grid-filament circuit is driven by means of a coupling loop 247 brought in by a side tube 249 through the flange 3'. This side tube forms a coaxial line with the loop conductor, and where the loop emerges from the line its grounded side is brought in coplanar with the control grid disc 16', lying in a slot 250 in the disc. The loop is located not far from the potential node and current loop in the grid-filament line, and its size is proportioned to give a satisfactory input impedance. By means of this line the grid circuit may be driven either from a separate source, so that the tube as a whole acts as an amplifier, or it may be coupled back to the output line from the anode to make the tube self-oscillatory, the length of line between anode and grid circuits being of the correct length to drive the grid circuit in the proper phase.

Cooling of the accelerator-boundary grid is accomplished by a water pipe 251, brought in through the flange 3' and forming a single turn in contact with the grid disc 237, as shown in Figs. 18 and 21. Another cooling pipe 252 is brought in through the flange 201, encircles the central column slightly below the filament plane, in contact with the outer conductor 232 of the grid-filament line.

This tube differs from the one previously described in that it is designed for operation with the accelerator grid at ground potential, and with the filament at accelerating potential negative to ground, the filament swinging with respect to ground instead of the grid so doing. It differs in operation in that, owing to the method of coupling the grid circuit, it is extremely sharply tuned, the first tube described being relatively broad in comparison. The instant tube is accordingly more critical in adjustment, but the number of adjustments is less, namely, the tuning of the anode circuit and the tuning of the sliding skirt 234, and the value of the accelerating voltage.

It may be noted here that this form of the device may and frequently will be operated using a quarter-cycle or 90° transit time instead of the half-cycle or 180° transit hitherto considered. The actual choice of mode depends largely on the frequency desired. At the higher frequencies, within the range of operation, high voltages, to give high powers, will give half-cycle transits along the lengths of path here provided. At the lower frequencies of the tube's range the electrons would traverse much longer paths in one half cycle if subjected to the same potentials, and if the voltages be reduced to make the transit occupy the half-cycle period much less power is available.

At these lower frequencies, if the tube is to be used as an oscillator it is therefore advisable to maintain the voltage high, giving quarter-cycle transits, and modify the feed-back to get the proper phase relationships. Since the filament is driven in this modification, instead of the grid, the proper phase condition will be met by tuning the filament-grid circuit to exact resonance (i. e., so that its input impedance appears resistive) and coupling the filament to the anode capacitively, or by using inductive coupling and making the anode-grid coupling line of the right electrical length to give the proper phase at the grid. Where used as a power amplifier the coupling need not enter into consideration, the voltage merely being adjusted to give the proper chosen transit time.

The tube shown in Figs. 22 to 31 inclusive, is intended for operation at very high power and in a vertical position only. Its envelope is constructed of successive flanges and tubes of glass or metal, and since the lower portion of the envelope and the major inner structure substantially duplicate the upper, and the supporting and alining mechanism is all comprised within the upper portion, only the upper half of the envelope is shown in order to conserve space and avoid complexity.

The portions of the envelope shown comprise the conducting anode housing 300, anode housing end flange 301, and insulating cylinders 302, 303 and 304 mounted successively on top of the flange 301 and separated respectively by a grid support flange 305 and a filament support flange 307. This structure is closed at the upper end by a cap flange 309 and a filament bracket housing 310.

The tube is constructed of coaxial elements each supported from its upper end, the innermost element being supported from the uppermost flange and the successive coaxial structures being carried in turn by the successive flanges. The central element is the lead connecting to the lower end of the filament, and is suspended by a spring 311 from a U-shaped filament support bracket 312 borne by the flange 309 and extending upwardly from that flange within the filament support housing 310. The end of the spring is provided with a hook or loop engaging a transverse pin in the top of a threaded bushing 313, which terminates in a flange 314. To the latter is hard-soldered an inner cylinder 315, the sides of which are flattened as shown in Fig. 24 to form water channels between the cylinder 315 and an outer cylinder 317. The two channels formed by flattening the inner cylinder are connected by an annular groove 319 at the lower end of the cylinder, and at the upper end they connect through a closing fitting 320 with inlet and outlets pipes 321 and 321'. These connect with the inlet feed pipes (not shown) by means of a metal bellows 322. Above the fitting 320 is a heavy copper washer 325, and laminated leads of thin copper 327 are clamped between this washer and an upper washer 328 by a clamp and locknut mechanism 329, 330, threaded on the end of the bushing 313.

The lower filament mounting ring 331 is threaded to the lower end of this support assembly. The ring is a heavy solid copper annulus with a chamfered lower edge into which the filament clamp screws 332 are threaded. The substantially similar upper support ring 333 is mounted immediately above it on a support assembly comprising concentric pipes 334, 335, forming a cooling system substantially like that of the inner support, the double supporting tubes being mounted from their upper ends on the filament flange 307.

The filaments 17" are mounted between the two support rings at uniformly spaced intervals about the two rings. A radio-frequency by-pass between the two rings is formed between the inner and outer columns by means of a short annular skirt 336 mounted on the conductor 317, which forms a quarter-wave open-end transmission line when considered from the periphery of the two opposed filament support rings to the end of the skirt. Two quarter-wave untuned choke sections 337 and 339 are mounted on the conductor 317 above the by-pass section to prevent radiation or escape of power between the filament support columns and accentuate the by-pass action so that there is no danger of burning out the filaments from radio-frequency currents in the event of unbalance between the two halves of the device. Considered from the outside of the filament support assembly, the lower support is made electrically symmetrical with the upper with respect to the midpoint of the filaments, by means of a cylindrical conductor 338 the same diameter as the outer support 334, which extends downwardly from the lower support ring 331. Outside of this conductor all of the transmission line elements which will be described in connection with the upper half of the tube are duplicated, so that as regards the filament-grid circuits the tube is symmetrical about the midplane of the filaments.

The upper and lower filament supports are held accurately concentric by two sets of centering pins 341 and 340 as shown in Figs. 23 and 29 respectively. The pins 340 of the lower set have rounded or pointed inner ends, which seat in similarly formed cavities in insulating buttons 342 in the bottoms of tubular cups 343 positioned radially in the inner supporting cylinders 315 and 317 within the upper filament support ring 333. The latter is drilled to receive sliding metal caps 344 which receive the outer ends of the pins and are adjustable by means of set-screws 345 threaded into the outer ends of the drill holes. Two of the set-screws bear directly against the caps 344; between the remaining cap and set-screw a spring washer 347 is inserted which permits all of the set-screws to be set up tightly and still permits the pins to rock slightly in vertical planes to compensate for filament expansion.

The upper set of pins 341 have conical heads 349 of lava or other refractory insulating material bearing in conical depressions in the bushing 313 from which the inner assembly is supported. The outer ends of these pins also bear in conical seats (not shown) in adjusting cups 350 threaded into brackets 351 carried by the flange 307, one of these pins also having a spring interposed between it and its seat. The inner (and lower) filament support is thus accurately centered, and although it is free to move vertically to compensate for changes in filament length with temperature the major portion of its weight is carried by the spring 311, so that the filaments are not overstressed, particularly when hot and not able to support any material mechanical load.

The grid structure is suspended from the grid flange 305, and comprises a conducting cylinder 352 secured to this flange and extending downward to terminate in an internally chamfered edge immediately above the filaments. As can be seen best in Fig. 25, which is a sectional view taken in the plane between the two filament supports, the grid itself comprises parallel strips 353, with the filaments extended between their rounded edges, these strips being fastened with screws between the support tube 352 and a similar lower extension of the same 352'.

The cathode-grid circuit is accurately tuned by means of a slider which comprises a piece of thin wall tubing 354 fitting smoothly within the grid column 352. Within this tubing a pair of spaced annular collars 355 and 357 carry quarter wavelength skirts 359 and 360 to form in duplicate the now familiar by-pass choke combination. Cooling for the slider is provided by a water pipe 361 brought in through the flange 305 and formed into a plurality of coils above this flange to give it flexibility. It is brought down into the slider through the upper ring 355 and passes between its outer wall 353 and a protecting liner 362 to the plane of the collar 357, where it encircles the collar and passes back out of the slider again parallel to its entrance.

The method of tuning the slider is best shown in Figs. 24 and 26. A tuning shaft 363 passes through the flange 305, protected by a Wilson seal (not shown), the shaft terminating in a small bevel gear 364. This gear meshes with a similar gear 365 on a shaft 366, and the bevel gear meshes with two others 367 on two branch shafts 369, mounted nearly at right angles with each other so as to clear the central column. The outer ends of these two shafts carry miter gears 370 which mesh with similar gears 371 on vertical shafts 372 which are threaded into the slider. By this method the position of the slider may be accurately adjusted by turning the shaft 363. The shaft 366 extends downwardly past the filament plane in a groove 373 in the outer periphery of the cylinder 352, and operates a slider for tuning the lower portion of the grid circuit in the same manner. The groove 373 in the outer wall of the grid cylinder is one of six symmetrically arranged grooves.

Two of these grooves 373' carry grid cooling pipes 368, soldered to the grid conductor throughout their length. The other three grooves 373" carry tie-bolts 376 which connect the upper and lower halves of the grid conductor, so that complete reliance for mechanical strength need not be placed in the joints of the grid strips 353.

It will be noted that the lines extending up from the middle of the filament can be accurately tuned to form a closed three-quarter wavelength section by means of the method above described. Above this section is a closed one-quarter wavelength choke and series-line by-pass section which is not tuned, but which is provided merely from an excess of caution to suppress residual radiation which may get past the tuned section. This excess of caution is, however, highly advisable in tubes of as high power as that for which the present tube may be constructed.

In the present case the accelerator grid and boundary grid are again combined in a single structure, but in this instance this structure is operated at anode potential. Furthermore, the boundary grid-accelerator grid structure is made unitary with the anode resonator, and comprises an outer housing formed of sectors of D-shaped cross-section, as is shown in Fig. 22, the semi-toroidal member 375 which forms the inner surface or curved side of the D being slotted opposite the filament-grid slots to permit the ingress of electrons. The straight sides of the resonator sectors are formed of flexible diaphragm 377', which are brazed to the anodes themselves.

The resonator is supported by a short tubular conductor 379, terminating in a mounting flange 380 to which the resonator is directly secured. The anode is formed of movable wedge-shaped sectors 381 (Fig. 25) supported from an annular bracket 382 dependent from the flange 301. Each of the wedges 381 has a square stem 383 projecting from its base and passing through an inwardly projecting boss 384 carried by the bracket. The stems are provided with rack teeth 385 for engaging pinions 387 mounted on vertical shafts 389 one of which, 389", is extended through the flange 301 and a Wilson seal (not shown) to permit anode tuning. The shafts 389, 389' all carry pinions 390 which mesh with a single ring gear 391 which slides in a bearing formed by a ring 392. The anodes are thereby tuned simultaneously by rotation of the shaft 389', back-lash and consequent non-uniformity of tuning being prevented by springs 394.

The capacity afforded by the anode surfaces to the outer wall of the resonator cavity, as formed by the boundary grid, is a large proportion of the total capacity of the system, and very slight motion of the anode sectors will vary it through the tuning range of the tube. The diaphragms 377 and wall 375 of the housing readily flex to give the small movement required. No particular provision need be made to prevent escape of R.-F. power through the slots left between the housing sectors, as these lie parallel to the planes of current flow within the resonator, and no appreciable potentials exist across them.

The V-shaped grooves 395 into which the electron streams are directed are formed between adjacent anode wedges. The bottoms of these grooves are closed by lugs 397 which project from one side of the base of each wedge and engage a corresponding recess 399 in the side of the next thus preventing egress of electrons.

Provision is made for cooling both anodes and anode resonator. Each anode is hollow and is provided with baffles 400, which direct flow occurring into and out of the wedges through flexible copper tubes 401 and 402. These tubes connect respectively to inlet and outlet manifolds 403 and 404, which are fed by and discharge through pipes 405 and 407 respectively. Additional manifolds 409 and 410 are connected by small cooling pipes 411 hard-soldered to the anode resonator at the edges of the slots therein which act as the accelerating grid.

Power is withdrawn from the anode circuit through a loop 412 at the terminus of a concentric line 413. These are indicated schematically since they are brought into the tube at a point not conveniently to be shown in the drawings because of interference with the showing of the cooling system. The grid circuit is fed by a similar line and coupling loop 414.

All portions of both grid and anode circuits are so closely coupled that it makes little difference where the external coupling is made with either, as long as the potential loops of the system are avoided and even here coupling would not be impossible were it desired to use electrostatic coupling. Considered on both sides of the plane of symmetry at the mid-point of the filaments the grid circuit is a closed three halves wave resonator, with a potential loop at its mid-point. The two halves of the line may be considered as connected in push-pull. This concept, of course, disregards the low impedance by-pass lines continuing to the outer world, and treats them merely as the short circuits to which they are equivalent.

Escape of power from the anode housing is prevented by choke-by-pass combinations comprising cylindrical conductor 415 extending upward from the flange 301 and forming an extension of conductor 379, an annular spacer 416 shorting the end of the choke section, and an inner concentric conductor 417 mounted on the spacer and depending therefrom and forming the inner conductor of the choke section and the outer conductor of a quarter-wave by-pass section of which the inner conductor is the grid column 352. The upper end of conductor 415 is turned inwardly to reduce concentration of dielectric stress on the glass at its point of termination. For somewhat the same reason flange 305 has depending from it a short skirt 419, to remove the point of maximum dielectric stress from the neighborhood of the seal at the end of the glass insulating cylinder 302.

Except for the fact that the anode resonator is all at the same D.-C. potential there is no difference in principle between this tube and the one last described, or, in fact, the tube of Fig. 1. In all the filament-grid capacity is large. In all this fact is unimportant because the inductance to tune this capacity may be formed by a section of low-loss line which may be made short enough to act as an inductance as small as may be desired. In all the grid action is the same, the space charge region being made so shallow that the "explosive" action is obtained. And in all the transmission line supports, by reason of the impedance ratios offered by their respective sections, prevent undesired escape of power through the gaps in the shielding which are necessary to maintain the required D.-C. potential differences, and permit the electrodes to operate as though suspended in the spaces within complete shields. But it should be remembered that this is the result of careful predetermination of potential loops and nodes and the impedances of the line sections terminating at these points, for with other arrangements it would be quite possible to radiate all of the power generated from the tube itself, or even so to increase such losses and the damping introduced thereby that the device would not operate at all.

The principles to be kept in mind to accomplish the desired result are (1) that in a series-circuit gaps in the outer shield necessary for insulation should be formed as low impedance lines with high terminating impedances, (2) terminating at current nodes, and (3) effectively in series with high impedance resonating line sections, and that gaps for supports which are effectively in parallel should (4) be at current loops and (5) constitute high impedance line sections.

None of these requirements necessarily means absolutely accurate tuning of the respective sections constituting the concentric line supports. The closer to a current node a low impedance by-pass section terminates the less necessary it becomes that it should itself be of exactly one-quarter wavelength, and the lower may be the terminating impedance at its outer end in order to avoid important power losses, while on the other hand, if it be of exactly one-quarter wavelength and it terminates in high impedance, the less necessary is it that it terminate exactly at a node. And, of course, the greater the proportion of the available power that circulates in such a structure, the more necessary it becomes that all the desirable conditions be met, for it is clear that protection which would be ample across a filament and would not warrant refinements of tuning if so located would be quite inadequate in an anode or grid circuit where power is precious.

I claim:

1. A substantially non-radiating resonator having two conducting members separated by insulation comprising an outer shield member and an inner columnar member, and radiation preventing means comprising a conductive skirt of substantially an odd number of quarter-wave's length at the frequency of resonance of said resonator mounted intermediate said members substantially coaxial therewith and spaced from one of said members and conductively connected to the other at its outer end only.

2. A substantially non-radiating resonator having two conducting members separated by insulation comprising an outer shield member and an inner columnar member, and radiation preventing means comprising a conductive skirt of substantially an odd number of quarter-wave's length at the frequency of resonance of said resonator mounted intermediate said members substantially coaxial therewith and spaced from one of said members and conductively connected to the other at its outer end only, said skirt being positioned in closer relationship to the member to which it is not connected than to the other in order to cause the transmission line sections constituted thereby to have greatly different characteristic impedances.

3. A substantially non-radiating resonator having two conducting members separated by insulation comprising an outer shield member and an inner columnar member, and radiation preventing means comprising a conductive skirt of substantially an odd number of quarter-wave's length at the frequency of resonance of said resonator mounted intermediate said members substantially coaxial therewith and spaced from one of said members and conductively connected to the other at its outer end only, and means for supporting and insulating said members connected thereto outwardly of said skirt.

4. A substantially non-radiating resonator having two conducting members separated by insulation comprising an outer shield member and an inner columnar member, and radiation preventing means comprising a conductive skirt of substantially an odd number of quarter-wave's length at the frequency of resonance of said resonator mounted intermediate said members substantially coaxial therewith and spaced from said outer member and conductively connected to said inner member at its outer end only, and a structure for supporting said members and said skirt and for insulating said inner and outer members.

5. A substantially non-radiating resonator having two coaxial conducting members separated by insulation comprising an outer shield member and an inner columnar member, and radiation preventing means comprising a conductive skirt member mounted intermediate said insulated members, and adjustable means for conductively connecting said skirt member at its outer end only to one of said insulated members with the length of said skirt substantially an odd number of quarter wavelengths at the frequency of said resonator.

6. A substantially non-radiating resonator having two conducting members separated by insulation comprising an outer shield member and an inner columnar member, and radiation preventing means comprising a conductive skirt of substantially an odd number of quarter-wave's length at the frequency of resonance of said resonator mounted intermediate said members substantially coaxial therewith and spaced from said outer member and connected to the inner member at its outer end.

7. A substantially non-radiating resonator having two conducting members separated by insulation comprising an outer shield member and an inner columnar member, and radiation preventing means comprising a conductive skirt of substantially an odd number of quarter-wave's length at the frequency of resonance of said resonator mounted intermediate said members substantially coaxial therewith and spaced from said outer member and conductively connected to the inner member at its outer end only, said skirt being positioned in closer relationship to said outer member than to said inner member.

8. Apparatus in accordance with claim 7 wherein means are provided to change the position of the connection of said skirt member on said columnar member.

9. A substantially non-radiating resonator comprising a base plate of conducting material, an inner conductor supported by said plate, an open ended skirt member on said plate extending upwardly and concentrically around a portion of said inner conductor and terminating free in space, an envelope of insulating material supported by said plate and surrounding said skirt, an outer conductor supported on said envelope concentrically positioned around said skirt and said inner conductor and terminating adjacent the terminus of said inner conductor, and means above said plate for conductively connecting said inner conductor and said skirt.

10. A substantially non-radiating resonator comprising a base plate of conducting material, an inner conductor supported by said plate, an open ended skirt member on said plate extending upwardly and concentrically around a portion of said inner conductor and terminating free in space, an envelope of insulating material supported by said plate and surrounding said skirt, an outer conductor supported on said envelope concentrically positioned around said skirt and said inner conductor and terminating adjacent the terminus of said inner conductor, and an annular conductor bearing on said skirt and said inner conductor above said plate.

11. A substantially non-radiating resonator comprising a base plate of conducting material, an inner conductor supported by said plate, an open ended skirt member on said plate extending upwardly and concentrically around a portion of said inner conductor and terminating free in space, an envelope of insulating material supported by said plate and surrounding said skirt, an outer conductor supported on said envelope concentrically positioned around said skirt and said inner conductor and terminating adjacent the terminus of said inner conductor, an annular conductor bearing on said skirt and said inner conductor above said plate, and means for axially moving said annular conductor along said skirt and said inner conductor and in contact therewith.

12. A substantially non-radiating resonator comprising a base plate of conducting material, an inner conductor supported by said plate, an open ended skirt member on said plate extending upwardly and concentrically around a portion of said inner conductor and terminating free in space, an envelope of insulating material supported by said plate and surrounding said skirt, an outer conductor supported on said envelope concentrically positioned around said skirt and said inner conductor and terminating adjacent the terminus of said inner conductor, an annular conductor bearing on said skirt and said inner conductor above said plate, and means passing through said base plate for axially moving said annular conductor along said skirt and said inner conductor and in contact therewith.

13. Apparatus in accordance with claim 9 wherein said outer conductor has an end aperture therein of greater diameter than that of said inner conductor, and wherein said inner conductor passes through said aperture.

14. Apparatus in accordance with claim 9 wherein said skirt is short relative to the extent of said inner and outer conductors.

15. Apparatus in accordance with claim 9 wherein said skirt is short relative to the extent of said inner and outer conductors, and wherein said skirt is closer to said outer conductor than to said inner conductor.

16. Apparatus in accordance with claim 9 wherein said skirt is short relative to the extent of said inner and outer conductors, and wherein a conductive annular member is mounted on said inner conductor between the end of said skirt and the ends of said inner and outer conductors, said annular member having a concentric cylindrical surface spaced from the inner wall of said outer conductor.

17. Apparatus in accordance with claim 9 wherein said skirt is short relative to the extent of said inner and outer conductors, and wherein a conductive annular member is mounted on said inner conductor between the end of said skirt and the ends of said inner and outer conductors, said annular member having a concentric cylindrical surface spaced from the inner wall of said outer conductor, and wherein means are provided to slide said annular member along said inner conductor.

18. Apparatus in accordance with claim 9 wherein said skirt is short relative to the extent of said inner and outer conductors, and wherein a conductive annular member is mounted on said inner conductor between the end of said skirt and the ends of said inner and outer conductors, said annular member having a concentric cylindrical surface spaced from the inner wall of said outer conductor, and wherein means are provided passing through said base plate and inside of said inner conductor to slide said annular member along said inner conductor.

19. A resonator comprising inner and outer conductors forming a line open at both ends, a support for said inner conductor comprising a supporting conductor extending laterally through the wall of said outer conductor substantially at a resonance node of potential, said outer conductor being apertured to pass said supporting conductor, a shield connected to said outer conductor and forming with said supporting conductor an open-ended transmission line of substantially an even number of quarter-wave's length at the frequency of said resonator, and means insulated from said outer conductor for holding said supporting conductor in fixed relation to said inner and outer conductors.

20. Apparatus in accordance with claim 19 wherein said support conductor and said shield are connected and positioned by insulation.

21. Apparatus in accordance with claim 19 wherein said support conductor and said shield are connected and positioned by insulation concentrically surrounding said supporting conductor inside of said shield.

DAVID H. SLOAN.